(12) United States Patent
Lee et al.

(10) Patent No.: US 7,062,226 B2
(45) Date of Patent: *Jun. 13, 2006

(54) METHOD FOR SUPPORTING A DISCONTINUOUS TRANSMISSION MODE IN A BASE STATION IN A MOBILE COMMUNICATION SYSTEM

(75) Inventors: Hyun-Seok Lee, Seoul (KR); Yong Chang, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 111 days.

This patent is subject to a terminal disclaimer.

(21) Appl. No.: 10/718,319

(22) Filed: Nov. 20, 2003

(65) Prior Publication Data
US 2005/0032551 A1    Feb. 10, 2005

Related U.S. Application Data

(63) Continuation of application No. 09/570,265, filed on May 12, 2000, now Pat. No. 6,731,948.

(60) Provisional application No. 60/133,790, filed on May 12, 1999.

(51) Int. Cl.
*H04B 7/20* (2006.01)

(52) U.S. Cl. .................. 455/52; 455/69; 455/67.11; 455/450

(58) Field of Classification Search ............ 455/522, 455/69, 68, 450, 453, 524, 561, 458; 370/342, 370/328, 335, 252; 465/67.11
See application file for complete search history.

(56) References Cited

U.S. PATENT DOCUMENTS 5,345,598 A    9/1994    Dent
5,461,639 A    10/1995   Wheatley et al.
5,574,982 A    11/1996   Almgren et al.
5,590,409 A    12/1996   Sawahashi et al.
5,781,856 A    7/1998    Jacobs et al.
5,881,368 A    3/1999    Grob et al.
5,884,187 A    3/1999    Ziv et al.
5,893,035 A    4/1999    Chen
5,953,666 A    9/1999    Lehtimaki (Continued)

FOREIGN PATENT DOCUMENTS

JP    11-074835    3/1999

(Continued)

OTHER PUBLICATIONS

"Mobile Station-Base Station Compatibility Standard for Wideband Spread Spectrum Cellular Systems", TIA/EIA Standard, Mar. 1999.

*Primary Examiner*—Joseph Feild
*Assistant Examiner*—KAmaran Afshar
(74) *Attorney, Agent, or Firm*—Dilworth & Barrese, LLP

(57) ABSTRACT

A method for transmitting a signal from a base station transceiver system (BTS) to a base station controller (BSC) when there is no data transmitted from a mobile station while in discontinuous transmission (DTX) mode, in a mobile communication system. Upon detection of the discontinuous transmission mode, it is determined what type of frame was last transmitted from the mobile station, and the present power control information is set according to the type of frame. Thereafter, the base station transceiver system transmits a reverse message including the present power control information to the base station controller over a dedicated control channel. If there is data being transmitted between the mobile station and the base station transceiver system at the time where the discontinuous transmission mode is detected, the previous power control information is set to the present power control information.

9 Claims, 16 Drawing Sheets

U.S. PATENT DOCUMENTS

| | | |
|---|---|---|
| 6,169,731 B1 * | 1/2001 | Stewart et al. .............. 370/332 |
| 6,249,894 B1 * | 6/2001 | Lin et al. .................... 714/748 |
| 6,438,119 B1 | 8/2002 | Kim et al. |
| 6,452,941 B1 | 9/2002 | Bruhn |
| 6,473,419 B1 | 10/2002 | Gray et al. |
| 6,480,472 B1 | 11/2002 | Jou et al. |
| 6,728,551 B1 * | 4/2004 | Chang ....................... 455/522 |
| 6,731,948 B1 * | 5/2004 | Lee et al. ................... 455/522 |
| 2001/0046878 A1 * | 11/2001 | Chang ....................... 455/522 |
| 2002/0012326 A1 * | 1/2002 | Chang ....................... 370/318 |

FOREIGN PATENT DOCUMENTS

| | | |
|---|---|---|
| WO | WO 98/11677 | 3/1998 |
| WO | WO 98/36508 | 8/1998 |
| WO | WO 99/14975 | 3/1999 |

* cited by examiner

| INFORMATION ELEMENT | ELEMENT DIRECTION | TYPE |
|---|---|---|
| MESSAGE TYPE | SDU > BTS | M |
| FORWARD LAYER 3 DATA | SDU > BTS | M |
| MESSAGE CRC | SDU > BTS | M |

FIG. 3

(PRIOR ART)

| INFORMATION ELEMENT | ELEMENT DIRECTION | TYPE |
|---|---|---|
| MESSAGE TYPE II | BTS > SDU | M |
| REVERSE LAYER 3 DATA | BTS > SDU | M |
| MESSAGE CRC | BTS > SDU | M |

FIG. 5

(PRIOR ART)

FIG. 4
(PRIOR ART)

| 7 | 6 | 5 | 4 | 3 | 2 | 1 | 0 | OCTET |
|---|---|---|---|---|---|---|---|---|
| FORWARD LAYER 3 DATA | | | | MESSAGE TYPE | | | | 1 |
| RESERVED | | | SOFT HANDOFF LEG # | | SEQUENCE NUMBER | | | 1 |
| FORWARD TRAFFIC CHANNEL GAIN | | | | | | | | 2 |
| REVERSE TRAFFIC CHANNEL $E_b/N_t$ | | | | | | | | 3 |
| RATE SET INDICATOR | | | FORWARD TRAFFIC CHANNEL RATE | | | | | 4 |
| RESERVED | | | | POWER CONTROL SUBCHANNEL COUNT | | | | 5 |
| FORWARD TRAFFIC CHANNEL INFORMATION + LAYER 3 FILL | | | | | | | | VARIABLE |
| FORWARD LAYER 3 DATA | | | | | | | | |
| MESSAGE CRC | | | | | | | | m |

FIG. 6
(PRIOR ART)

| 7 | 6 | 5 | 4 | 3 | 2 | 1 | 0 | OCTET |
|---|---|---|---|---|---|---|---|---|
| FORWARD LAYER 3 DATA | | | | | | | | 1 |
| RESERVED | SOFT HANDOFF LEG # | | MESSAGE TYPE | | | | | 1 |
| REVERSE TRAFFIC CHANNEL QUALITY | | | | SEQUENCE NUMBER | | | | 2 |
| SCALING | | PACKET ARRIVAL TIME ERROR | | | | | | 3 |
| RATE SET INDICATOR | | RESERVED | | | REVERSE TRAFFIC CHANNEL RATE | | | 4 |
| | | | | | | | EIB | 5 |
| REVERSE TRAFFIC CHANNEL INFORMATION + LAYER 3 FILL | | | | | | | | VARIABLE |
| REVERSE LAYER 3 DATA | | | | | | | | m |
| MESSAGE CRC | | | | | | | | m+1 |

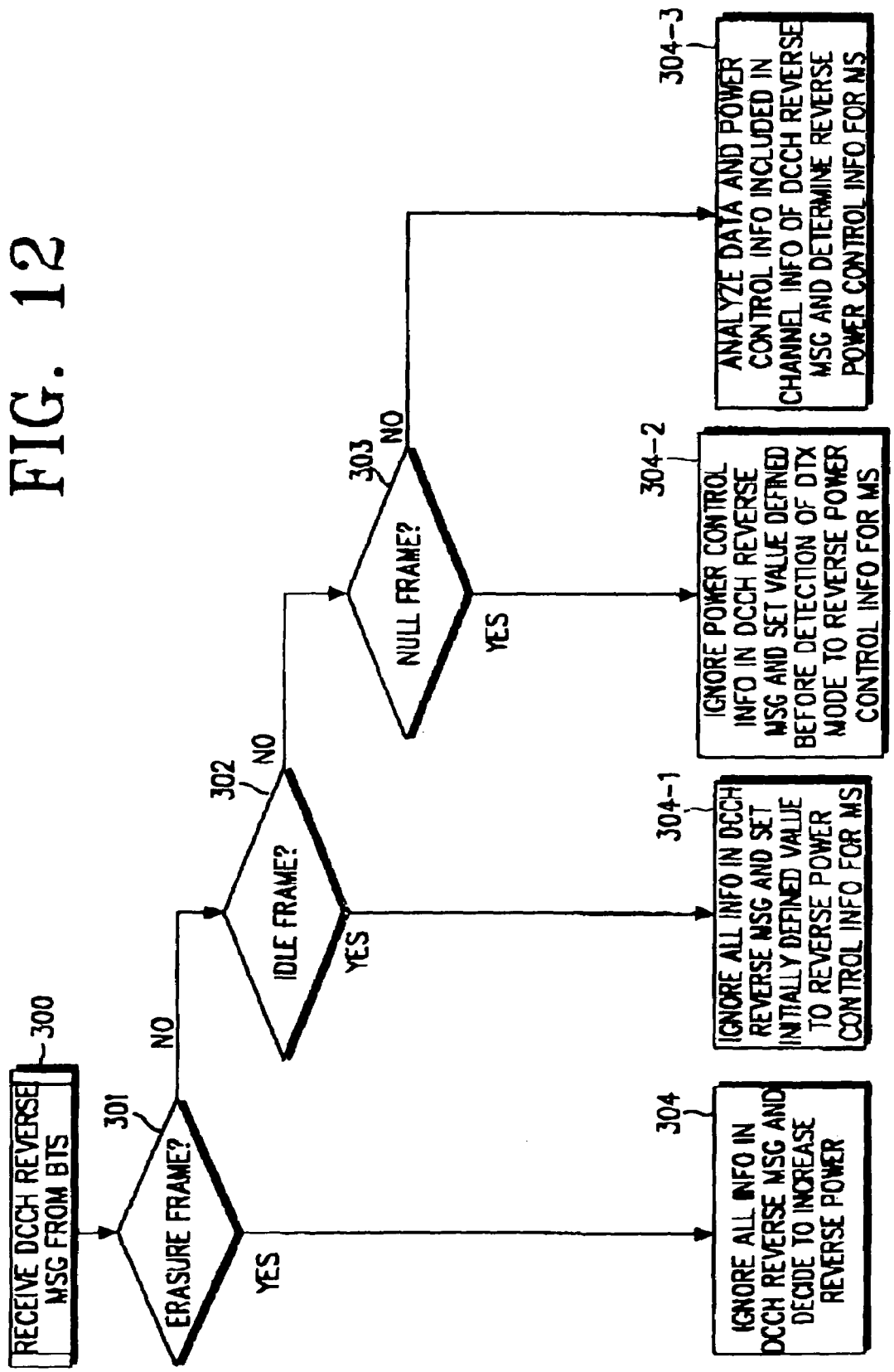

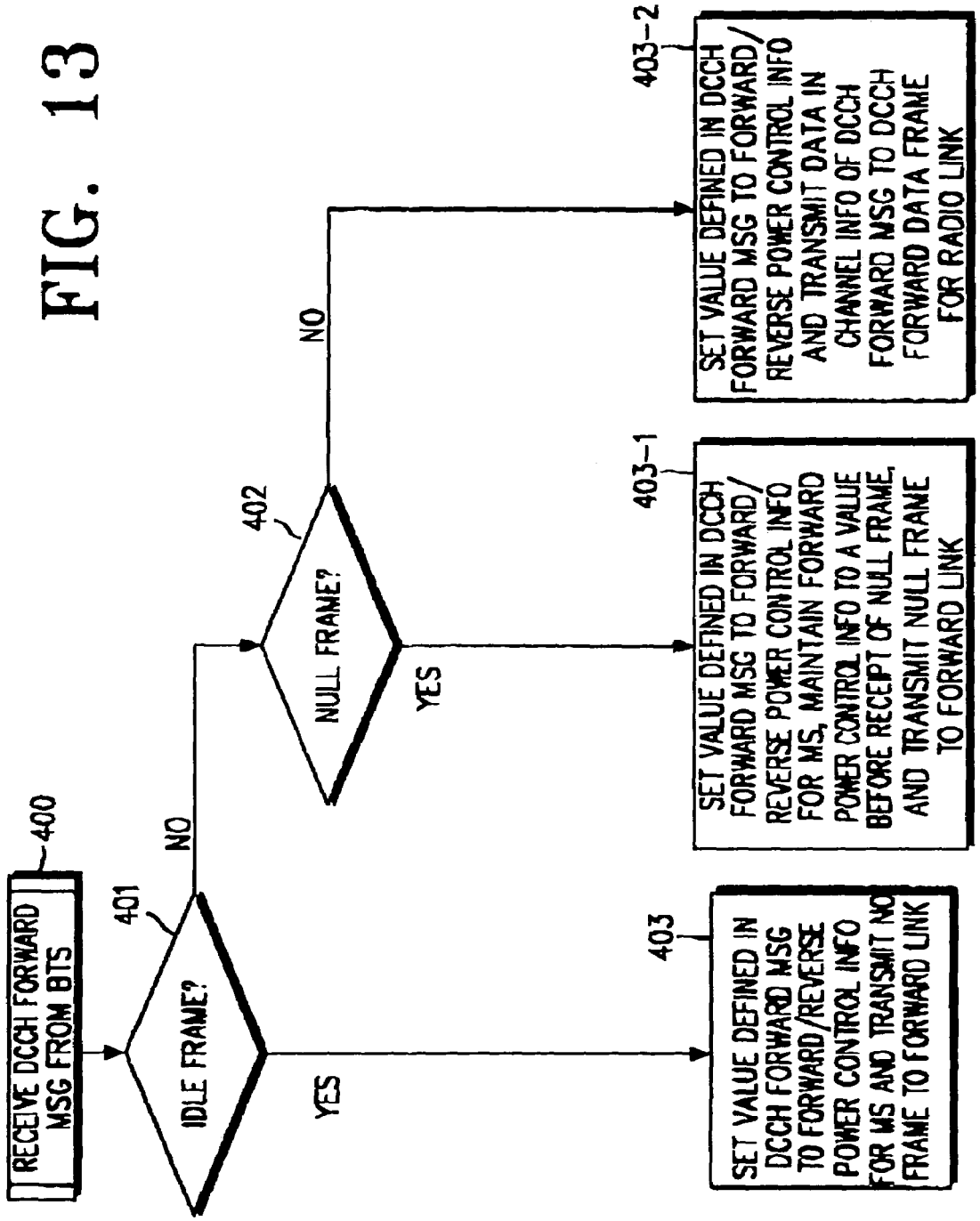

METHOD FOR SUPPORTING A DISCONTINUOUS TRANSMISSION MODE IN A BASE STATION IN A MOBILE COMMUNICATION SYSTEM

PRIORITY

This application is a Continuation of U.S. patent application Ser. No. 09/570,265, which was filed in the United States Patent and Trademark Office on May 12, 2000, now U.S. Pat. No. 6,731,948, and claims priority from a Provisional Application filed in the United States Patent and Trademark Office on May 12, 1999, which was assigned Ser. No. 60/133,790.

BACKGROUND OF THE INVENTION

1. Field of the Invention

The present invention relates generally to a CDMA (Code Division Multiple Access) mobile communication system, and in particular, to a method for enabling a base station to support a discontinuous transmission (DTX) mode in a dedicated control channel and a supplemental channel.

2. Description of the Related Art

Existing CDMA mobile communication systems have mainly provided voice service. However, in the near future, CDMA mobile communication systems will support the IMT-2000 (International Mobile Telecommunication-2000) standard which can provide data service as well as voice service. The IMT-2000 mobile communication system can support high-quality voice service, moving picture service and Internet search service.

A CDMA mobile communication system includes a base station (BS), which is comprised of a base station transceiver system (BTS) and a base station controller (BSC), a mobile switching center (MSC), and a mobile station (MS). A radio link existing between the MS and the BTS is divided into a forward link for transmitting a signal from the BTS to the MS and a reverse link for transmitting a signal from the MS to the BTS.

Every channel is divided into a physical channel and a logical channel. The logical channel is established over the physical channel, and several logical channels can be established on a single physical channel. If the physical channel is released, the logical channel established over the physical channel is automatically released. It is not necessary to establish the physical channel in order to establish a certain logical channel. When a physical channel to be established for a logical channel is already established for another logical channel, a required operation is only to assign this logical channel to the previously established physical channel.

The physical channel can be divided into a dedicated channel and a common channel according to its property. The dedicated channel is exclusively used for communication between the BTS and the MS, and includes a fundamental channel (FCH), a dedicated control channel (DCCH) and a supplemental channel (SCH). The fundamental channel is used to transmit voice signal, data signal and signaling signal. Such a fundamental channel is compatible with TIA/EIA-95-B. The dedicated control channel is used to transmit the data signal and signaling signal. The supplemental channel is used when large amounts of data need to be transmitted. The common channel is the physical channel other than the dedicated channel, and is commonly used by the base station and several mobile stations. A physical channel for the forward link transmitted from the BTS to the MS is called a paging channel, and a physical channel for the reverse link transmitted form the MS to the BTS is called an access channel. These common channels are compatible with IS-95-B.

In a mobile communication system, data communication has the characteristic that periods of bursty data transmission alternate with long periods of no data transmissions. Therefore, future mobile communication systems employ a discontinuous transmission (DTX) mode for assigning the dedicated channel only when data is transmitted during the data communication service.

The DTX mode refers to a mode in which a wired system or a mobile communication system transmits data on a frame unit basis only when there is data to transmit. That is, the DTX mode refers to a mode in which the wired system or the mobile communication system does not transmit data when there is no transmission data for a predetermined time period. The DTX mode has various advantages as follows. Since data is transmitted on a frame unit basis only when there is actual data, it is possible to minimize transmission power. Further, the overall interference of the system decreases in strength, thus increasing the overall system capacity.

However, since the frames are irregularly transmitted by the transmitter, the receiver cannot know beforehand whether frames have been transmitted or not. Accordingly, the BTS cannot independently perform forward power control. More specifically, if the receiver in the MS does not exactly know when the frame has been transmitted at the transmitter, the decision parameters of the decoder, including the cyclic redundancy code (CRC), and the decoding results are unreliable. Accordingly, in DTX mode, it is not possible to precisely control transmission power of the MS by applying the same method used in the continuous transmission mode.

The DTX mode is supported in the dedicated control channel and the supplemental channel. The dedicated control channel supports the DTX mode in which data is transmitted only when the upper layer generates transmission data. Because of such a property, the dedicated control channel is proper to be used as a control channel to effectively provide packet service. For this DTX period, it is possible to perform power control by transmitting a null frame over the dedicated control channel. The supplemental channel also supports the DTX mode for transmitting no data in a period where there is no data to transmit. In such a DTX period, no frame is transmitted over the supplemental channel. The DTX mode connects the dedicated traffic channel and control channel only in a period where the data is actually transmitted, and releases the dedicated channels when no data is transmitted for a predetermined time period, in consideration of the limited radio resources, the base station capacity, and the power consumption of the mobile station. When the dedicated channels are released, communication is performed through the common channel only, thereby increasing utilization efficiency of the radio resources. For such a DTX mode, there are required several states according to the channel assignment situation and existence/nonexistence of state information.

FIG. 1 shows a state transition diagram of a mobile communication system for a common packet service. Referring to FIG. 1, the states for the packet service are divided into an active state 11, a control hold state 12, a suspended state 13, a dormant state 14, a packet null state 15, and an initial state 10. In the control hold state 12, the active state 11, and suspended state 13, a service option is connected. In the other states, the service option is not connected. It should be noted that the present invention relates to the base station (BSC and BTS) for supporting the DTX mode in the supplemental channel and the dedicated channel in the active state 11 and the control hold state 12.

FIG. 2 shows a reference model of a 3G IOS (Interoperability Specifications) for a digital air interface between the MSC and the base station, and between the base stations in the common mobile communication system.

Referring to FIG. 2, between MSC 20 and BSC 32, a signal is defined as an A1 interface and user information is defined as A2/A5 (circuit data) interface. An A3 interface is defined to connect a target BS 40 to a frame selection/distribution unit (SDU) function block 34 of a source BS 30 for soft/softer handoff between the base stations. The signaling and user traffic between the target BS 40 and the SDU function block 34 of the source BS 30 are transmitted through the A3 interface. An A7 interface is defined for signal exchange between the target BS 40 and the source BS 30, for soft/softer handoff between the base stations. In a CDMA mobile communication system, the wired communication link between the base station 30 and the base station 40, and between the base station 30 and the MSC 20, is comprised of a forward link transmitted from the MSC 20 to the base station 30, a reverse link transmitted from the base station 30 to the MSC 20 and a line connected between the MSC 20 and the base station 30. The MSC 20 includes a call control and mobility management block 22 and a switching block 24. Further, the MSC 20 is connected to a data network such as the Internet through an interworking function (IWF) block 50.

FIG. 3 shows a message format (hereinafter, referred to as FCH forward message (or data frame)) transmitted over a user traffic subchannel in the form of the fundamental channel (FCH) to the BTS 36 or 44 from the BSC 32 (or 42).

The message format shown in FIG. 3 is used to transmit a forward traffic channel frame to the base transmission system, and has information elements including a message type, forward layer-3 data, and a message CRC. The FCH forward message is a message used between a BSC and a BTS in the same base station, or a message used between a BSC and a BTS belonging to different base stations. The FCH forward message has a different name according to the corresponding interface. For example, a message transmitted between a BTS and BSC in the same BS is called an Abis FCH forward message, and a message transmitted between a BTS and a BSC belonging to the different BSs is called an A3FCH forward message. FIG. 4 is a detailed diagram illustrating the information elements of the FCH forward message of FIG. 3.

Referring to FIG. 4, the forward layer-3 data portion of the FCH forward message includes CDMA forward traffic channel frame and control information for the packet transmitted to the target BTS 44 from the SDU function block 34 of FIG. 2. In FIG. 4, the power control information in this message, e.g., Forward Traffic Channel Gain, Reverse Traffic Channel Ew/Nt are used for BTS to adjust the reverse/forward power control level for the given MS. The other control information in this message, e.g., Soft HO Leg #, Sequence Number, Rate Set indicator, Forward Traffic Channel Rate and Power Control Subchannel Count are used for BTS to control the synchronization, the identification of the Soft Handoff Leg and the knowledge for data rate information to be sent over the air between BSC-SDU and BTS. Conclusively speaking, mainly BSC/SDU to BTS. The forward layer-3 data has the structure shown in Table 1 below.

TABLE 1

| 7 | 6 | 5 | 4 | 3 | 2 | 1 | 0 | Octet |
|---|---|---|---|---|---|---|---|---|
| Reserved | Soft Handoff Leg # | | | Sequence Number | | | | 1 |
| Forward Traffic Channel Gain | | | | | | | | 2 |
| Reverse Traffic Channel $E_W/N_T$ | | | | | | | | 3 |
| Rate Set Indicator | | | | Forward Traffic Channel Rate | | | | 4 |
| Reserved | | | | Power Control Subchannel Count | | | | 5 |
| Forward Traffic Channel Information + Layer-3 Fill | | | | | | | | Variable |

In Table 1, a first "Reserved" field of octet 1 is set to '0' by the SDU function block. A "Soft Handoff Leg #" field is used to carry the soft handoff leg number as determined by the source BS. A "Sequence Number" field is set to CDMA System Time in frames, modulo 16 (see 1.2 of TIA/EIA-95) corresponding to the transmission time of the frame over the air in the forward direction. A "Forward Traffic Channel Gain" field indicates the traffic channel gain obtained in the forward direction. A "Reverse Traffic Channel $E_W/N_T$" field indicates traffic channel $E_W/N_T$ required in the reverse direction. Here, $E_W$ denotes the total demodulated Walsh symbol energy and $N_T$ denotes the total received power spectral density on the RF channel. A "Rate Set Indicator" field indicates a Rate Set of the traffic channel frame as shown in Table 2 below.

TABLE 2

| Field Value | Meaning |
|---|---|
| 0000 | Rate Set 1 |
| 0001 | Rate Set 2 |
| All other values are reserved | |

Referring to Table 2, the field value '0000' indicates the Rate Set 1, and the field value '0001' indicates the Rate Set 2.

A "Forward Traffic Channel Rate" field of Table 1 indicates the rate at which the BTS transmits the forward traffic channel information to the MS, and will be set as shown in Table 3 below.

TABLE 3

| Field Value | Rate Set 1 Transmission Rate | Rate Set 2 Transmission Rate |
|---|---|---|
| 0000 | 9600 bps (Full Rate) | 14400 bps (Full Rate) |
| 0001 | 4800 bps (Half Rate) | 7200 bps (Half Rate) |
| 0010 | 2400 bps (Quarter Rate) | 3600 bps (Quarter Rate) |

TABLE 3-continued

| Field Value | Rate Set 1 Transmission Rate | Rate Set 2 Transmission Rate |
| --- | --- | --- |
| 0011 | 1200 bps (Eighth Rate) | 1800 bps (Eighth Rate) |
| 0100 | Idle Frame | Idle Frame |
| All other values are reserved. | | |

As shown in Table 3, for the field value '0000', the forward traffic channel information is transmitted at the full rate; for the field value '0001', the forward traffic channel information is transmitted at the half (½) rate; for the field value '0010', the forward traffic channel information is transmitted at the quarter (¼) rate; and for the field value '0011', the forward traffic channel information is transmitted at the eighth (⅛) rate. If the field value is '0100', an idle frame is transmitted. For an idle frame, the BTS does not transmit the frame and ignores all the information elements other than the Sequence Number field and the Frame Type field. Such an idle frame is used to adjust the frame arrival time.

A second "Reserved" field of octet 5 in Table 1 is set to '0000'. A "Power Control Subchannel Count" field indicates the number of independent power control subchannels involved in soft handoff. A "Forward Traffic Channel Information" field indicates the forward traffic channel information that the BTS is to send to the MS. The transmission rate can be any one of the transmission rates shown in Table 4 below. A "Layer-3 Fill" field indicates the number of bits in the Layer-3 Fill column corresponding to the transmission rate of the forward traffic, and can be any one of those shown in Table 5 below.

TABLE 4

| Rate Set | Transmission Rate (bps) | Number of Information Bits per Frame |
| --- | --- | --- |
| 1 | 9600 | 172 |
|   | 4800 | 80 |
|   | 2400 | 40 |
|   | 1200 | 16 |
|   | 0 | 0 |
| 2 | 14400 | 267 |
|   | 7200 | 125 |
|   | 3600 | 55 |
|   | 1800 | 21 |
|   | 0 | 0 |

TABLE 5

| Class | Transmission Rate (bps) | Number of Layer-3 Fill Bits per Frame |
| --- | --- | --- |
| Rate Set 1 | 9600 | 4 |
|   | 4800 | 0 |
|   | 2400 | 0 |
|   | 1200 | 0 |
|   | 0 | 0 |
| Rate Set 2 | 14400 | 5 |
|   | 7200 | 3 |
|   | 3600 | 1 |
|   | 1800 | 3 |
|   | 0 | 0 |

FIG. 5 shows a message format (hereinafter, referred to as FCH reverse message (or data frame) transmitted over a user traffic subchannel in the form of the fundamental channel (FCH) to the BSC 32 (or 42) from the BTS 36 (or 44) of FIG. 2.

The message format show in FIG. 5 is used to transmit the decoded reverse traffic channel frame and control information in the BTS, and has an information elements including a message type II, reverse layer-3 data and a message CRC. The FCH reverse message is a message used between a BSC and a BTS belonging to the same BS, or a message used between a BTS and a BSC belonging to different BSs. The FCH forward message has a different name according to the corresponding interface. For example, a message transmitted from a BTS to a BSC belonging to the same BS is called an Abis FCH reverse message, and a message transmitted between a BTS and a BSC belonging to different BSs is called an A3FCH reverse message.

FIG. 6 is a detailed diagram illustrating the information element of the FCH reverse message of FIG. 5.

Referring to FIG. 6, the reverse layer-3 portion data of the FCH reverse message includes CDMA reverse traffic channel frame and control information for the packet transmitted to the SDU function block from the target BTS. In FIG. 6, the power control information in this message, e.g., Reverse Traffic Channel Quality, EIB are used for BSC/SDU to determine the reverse/forward power control level to be sent to the BTS. The other control information in this message, e.g., Soft HO Leg #, Sequence Number, Rate Set indicator, Reverse Traffic Channel Rate, Scaling and Packet Arrival Time Error are used for BSC/SDU to control the timing for sending the forward Layer 3 data in FIG. 3 or 4, the identification of the Soft Handoff Leg and the knowledge for data rate information to be received over the air. Conclusively speaking, mainly BTS to BSC/SDU, Explicitly, source BTS to source BSC/SDU and target BTS to source BSC/SDU. The reverse layer-3 data has the structure shown in Table 6 below.

TABLE 6

| 7 | 6 | 5 | 4 | 3 | 2 | 1 | 0 | Octet |
| --- | --- | --- | --- | --- | --- | --- | --- | --- |
| Reserved | Soft Handoff Leg # | | | Sequence Number | | | | 1 |
| Reverse Traffic Channel Quality | | | | | | | | 2 |
| Scaling | | | | Packet Arrival Time Error | | | | 3 |
| Rate Set Indicator | | | | Reverse Traffic Channel Rate | | | | 4 |
| Reserved | | | | | | | EIB | 5 |
| Reverse Traffic Channel Information + Layer-3 Fill | | | | | | | | Variable |

In Table 6, a first "Reserved" field of octet 1 is set to '0' by the BTS. A "Soft Handoff Leg #" field is used to carry the soft handoff leg number as determined by the source BS on the A3-FCH forward message. A "Sequence Number" field is set to CDMA System Time in frames, modulo 16 (see 1.2 of TIA/EIA-95) corresponding to the receiving time of the air interface frame in the reverse direction. A "Reverse Traffic Channel Quality" field consists of a 1-bit CRC field and a 7-bit symbol error rate field. The 7-bit symbol error rate is the binary value of 127−(Min[Re-Encoded Symbol Error Rate×α, 255])/2 where the value of α is determined according to the reverse traffic channel rate as shown in Table 7 below.

TABLE 7

| Rate Set 1 Transmission Rate | Rate Set 2 Transmission Rate | Value (α) |
| --- | --- | --- |
| 9600 bps (Full Rate) | 14400 bps (Full Rate) | 1 |
| 4800 bps (Half Rate) | 7200 bps (Half Rate) | 2 |
| 2400 bps (Quarter Rate) | 3600 bps (Quarter Rate) | 4 |
| 1200 bps (Eighth Rate) | 1800 bps (Eighth Rate) | 8 |
| Idle Frame | Idle Frame | 0 |

As shown in Table 7, for the full rate, the value α is 1; for the half (½) rate, the value α is 2; for the quarter (¼) rate, the value α is 4; and for the eighth (½) rate, the value α is 8. If the most recently received forward frame received by the BTS from the SDU function block was an idle frame, then the BTS shall set the "Reverse Traffic Channel Quality" field to a value of 00H and shall send an idle frame to the SDU function block. The SDU function block shall ignore the value of this field in idle frames.

In Table 6, a "Scaling" field is the time scale for the "Packet Arrival Time Error (PATE)" field. The "Packet Arrival Timer Error" field indicates a time difference between the time at which the A3-FCH Forward message arrives and an average arrival time measured in units specified by the "Scaling" field, and can have the field values shown in Table 8 below.

TABLE 8

| Field Value | Time Units | PATE Range |
| --- | --- | --- |
| 00 | 125 μs | ±3.875 ms |
| 01 | 1.0 ms | ±31.0 ms |
| 10 | 1.25 ms | ±38.75 ms |
| 11 | 5 ms | ±155 ms |

A "Rate Set Indicator" field of Table 6 indicates a rate set of the traffic channel frame. If the BTS is sending an idle frame to the SDU function block, the SDU function block shall ignore the contents of this field. As shown in Table 9 below, the "Rate Set Indicator" field value of '0000' indicates the Rate Set 1, and the field value '0001' indicates the Rate Set 2.

TABLE 9

| Field Value | Meaning |
| --- | --- |
| 0000 | Rate Set 1 |
| 0001 | Rate Set 2 |
| All other values are reserved | |

A "Reverse Traffic Channel Rate" field of Table 6 indicates a transmission rate for the traffic channel information transmitted from the MS to the BTS, i.e., a transmission rate for sending the reverse traffic channel information, and can have the field values shown in Table 10 below. The field value '0000' corresponds to the full rate, the field value '0001' corresponds to the half (½) rate, the field value '0010' corresponding to the quarter (¼) rate, and the field value '0011' corresponds to the eighth (⅛) rate. If the BTS did not acquire the MS, the BTS defines the reverse traffic channel rate information having the field value '0101' as idle.

TABLE 10

| Field Value | Rate Set 1 Transmission Rate | Rate Set 2 Transmission Rate |
| --- | --- | --- |
| 0000 | 9600 bps (Full Rate) | 14400 bps (Full Rate) |
| 0001 | 4800 bps (Half Rate) | 7200 bps (Half Rate) |
| 0010 | 2400 bps (Quarter Rate) | 3600 bps (Quarter Rate) |
| 0011 | 1200 bps (Eighth Rate) | 1800 bps (Eighth Rate) |
| 0100 | Erasure | Erasure |
| 0101 | Idle | Idle |
| 0110 | Rate Set 1 Full Rate Likely | Reserved |
| All other values are reserved | | |

A "Reverse Traffic Channel Information" field indicates reverse traffic channel information that the BTS has received from the MS. The "Reverse Traffic Channel Information" field includes the number of information bits per frame, shown in Table 11 below, according to the rate sets. For example, for the Rate Set 1, when the transmission rate is 9600 bps, the number of information bits per frame is 172; and when the transmission rate is 1200 bps, the number of information bits per frame is 16. For the Rate Set 2, when the transmission rate is 1400 bps, the number of information bits per frame is 267; and when the transmission rate is 3600 bps, the number of information bits per frame is 55.

TABLE 11

| Class | Transmission Rate (bps) | Number of Information Bits per Frame |
| --- | --- | --- |
| Rate Set 1 | 9600 | 172 |
|  | 4800 | 80 |
|  | 2400 | 40 |
|  | 1200 | 16 |
|  | 0 | 0 |
| Rate Set 2 | 14400 | 267 |
|  | 7200 | 125 |
|  | 3600 | 55 |
|  | 1800 | 21 |
|  | 0 | 0 |
| Other | Erasure | 0 |
|  | Idle | 0 |

A "EIB (Erasure Indication Bit)" field of Table 6 indicates that an erasure frame has been transmitted. When Rate Set 1 is being used, the BTS shall set this bit to '0'. When Rate Set 2 is being used, the BTS shall set this bit to '1'. A second "Reserved" field of octet 5 is set to '0000000'. A "Layer-3 Fill" field indicates the number of bits in the Layer-3 Fill column corresponding to the transmission rate of the reverse traffic channel frame, and can be any one of those shown in Table 12 below according to the Rate Sets.

TABLE 12

| Class | Transmission Rate (bps) | Number of Layer 3 Fill Bits per Frame |
|---|---|---|
| Rate Set 1 | 9600 | 4 |
|  | 4800 | 0 |
|  | 2400 | 0 |
|  | 1200 | 0 |
|  | 0 | 0 |
| Rate Set 2 | 14400 | 5 |
|  | 7200 | 3 |
|  | 3600 | 1 |
|  | 1800 | 3 |
|  | 0 | 0 |
| Other | Erasure | 0 |
|  | Idle | 0 |

FIGS. 7 and 8 show soft/softer handoff addition and removal procedures, respectively, according to the prior art. These procedures are performed on the conventional FCH frame.

First, the soft/softer handoff addition procedure will be described with reference to FIG. 7.

In step 7a, the source BS 30 of FIG. 2 decides that one or more cells of the target BS 40 are required to support a present call in service during soft handoff, sends an A7-handoff request message to the target BS 40 and then activates a timer Thoreq. In step 7b, the target BS 40 initiates A3connection by sending an A3-connect message to a designated address for A3 connection required by the A-handoff request message. In step 7c, the course BS 30 sends an A3-connect Ack message to acknowledge completion of A3 connection or addition of the cells to the existing A3connection. In step 7d, the source BS 30 starts to transmit the forward frame to the target BS 40.

As synchronized with the source BS 30, the target BS 40 starts to transmit the forward frame to the MS in step 7e. Upon receipt of the first forward frame from the source BS 30, the target BS 40 starts to transmit a reverse idle frame to the source BS 30 in step 7f. The transmitted reverse idle frame includes time control information required for acquiring synchronization. The target BS 40 sends an A7-handoff request Ack message indicating success in cell addition, in step 7g. The source BS 30 then inactivates the timer Thoreq in response to the A7-handoff request Ack message. If the source BS 30 is selected such that the source BS 30 is to know transmission start and acceptance of the target BS 40 when the SDU function block 34 of the source BS 30 and the target BS 40 synchronize the A3-traffic subchannel, the target BS 40 sends an A3-traffic channel status message in step 7h. The step 7h is performed after the step 7d.

In step 7i, the source BS 30 sends a handoff direction message to the MS to add new cells to an active set. In step 7j, the MS sends an MS Ack order message indicating acknowledgement of the handoff direction message to the source BS 30. In step 7k, the MS sends a handoff completion message to the source BS 30 to notify successful process of the handoff direction message. In step 7l, the source BS 30 sends a BS Ack order message to the MS to acknowledge receipt of the handoff completion message. In step 7m, the source BS 30 sends a handoff performed message to the MSC. The handoff performed message can be transmitted any time after the source BS 30 receives the handoff completion message.

Next, the soft/softer handoff removal procedure will be described with reference to FIG. 8.

In step 8a, the source BS 30 encapsulates a handoff direction message in an A3-FCH forward message and transmits it to the target BS 40 to drop one or more cells from the active set. In step 8b, the source BS 30 and the target BS 40 send the handoff direction message to the MS. In step 8c, the MS sends an MS Ack order message to both the source BS 30 and the target BS 40 to acknowledge receipt of the handoff direction message. In step 8d, the target BS 40 sends the MS Ack order message received from the MS to the source BS 30 by loading the MS Ack order message in an A3-FCH reverse message. In step 8e, the MS sends a handoff completion message to the source BS 30 to indicate successful processing of the handoff direction message. In step 8f, the source BS 30 sends a BS Ack order message to the MS to acknowledge receipt of the handoff completion message.

The prior art has the following problems occurring in the base station, rather than in a radio link between the base station and the mobile station.

1) Absence of DCCH Related Supporting Method and Device

As shown in FIGS. 3 to 8, a method and device for processing the dedicated control channel (DCCH) newly added in the CDMA-2000 system is never defined in the existing standard. Therefore, a frame transmitted over the forward and reverse DCCHs between the BSC and the BTS is not defined and how to perform power control through the DCCH while the DCCH is in use, is also not defined.

2) Absence of DTX Mode Supporting Method

A method for processing the SCH and DCCH in a DTX mode, period which does not exist in the existing FCH, is not defined. For example, as shown in FIGS. 7 and 8, in the existing 3G IOS, the soft/softer handoff procedure and message is not defined on the DCCH frame. In addition, unlike the FCH, the DCCH supports the DTX mode in which no frame is generated and transmitted when there is no data, signaling, power control and MAC (Medium Access Control) signals transmitted from the upper layer to the physical layer. Since the message and procedure for the DCCH frame and the DTX mode operation is not presently defined on the soft/softer handoff-related A3 and A7 interfaces, there is required a message to be bi-directionally transmitted at the A3 and A7 interfaces for the DCCH frame, and a procedure for controlling and supporting the DTX mode on the DCCH in the base station.

SUMMARY OF THE INVENTION

It is, therefore, an object of the present invention to provide a method for transmitting and receiving a newly defined forward and reverse frame (message) over a dedicated control channel (DCCH) between a base station controller (BSC) and a base station transceiver system (BTS) in a mobile communication system.

It is another object of the present invention to provide a method for determining power control information and transmitting and receiving the power control information over a dedicated control channel between the base station controller and the base station transceiver system in a mobile communication system.

It is further another object of the present invention to provide a method for transmitting and receiving a signal over the dedicated control channel between the base station controller and the base station transceiver system during the discontinuous transmission (DTX) mode, in which data is transmitted only in a period where there is data to transmit, in a mobile communication system.

It is yet another object of the present invention to provide a method for determining power control information and transmitting and receiving the power control information over the dedicated control channel between the base station controller and the base station transceiver system during the discontinuous transmission mode, in which data is transmitted only in a period where there is data to transmit, in a mobile communication system.

It is still another object of the present invention to provide a soft/softer handoff method performed over the dedicated control channel in a mobile communication system.

It is still another object of the present invention to provide a soft/softer handoff method performed over the dedicated control channel during the discontinuous transmission mode, in which data is only transmitted in a period where there is data to transmit, in a mobile communication system.

To achieve the above objects, there is provided a method for transmitting a signal from a base station transceiver system (BTS) to a base station controller (BSC) when there is no data transmitted from a mobile station while in a discontinuous transmission (DTX) mode in a mobile communication system. The mobile communication system includes a mobile station for transmitting/receiving data in a predetermined period, a base station transceiver system and a base station controller for controlling the base station transceiver system. Upon detection of the discontinuous transmission mode, the base station transceiver system sets previous power control information that the base station transceiver system has used for power control of the mobile station before detection of the discontinuous transmission mode, to present power control information to the base station controller. Thereafter, the base station transceiver system transmits a reverse message including the present power control information to the base station controller over a dedicated control channel. When there is data being transmitted between the mobile station and the base station transceiver system at the time when the discontinuous transmission mode is detected, the previous power control information is set to the present power control information.

BRIEF DESCRIPTION OF THE DRAWINGS

The above and other objects, features and advantages of the present invention will become more apparent from the following detailed description when taken in conjunction with the accompanying drawings in which:

FIG. 3 is a diagram illustrating a message format transmitted over a user traffic subchannel from the base station controller (BSC) to the base station transceiver system (BTS) of FIG. 2 in the form of a fundamental channel (FCH);

FIG. 4 is a detailed diagram illustrating an information element of the FCH forward message shown in FIG. 3;

FIG. 5 is a diagram illustrating a message format transmitted over the user traffic subchannel from the BTS to the BSC of FIG. 2 in the form of the fundamental channel;

FIG. 6 is a detailed diagram illustrating an information element of the FCH reverse message shown in FIG. 5;

FIG. 12 is a flow chart illustrating a procedure for receiving a DCCH reverse message according to an embodiment of the present invention, wherein the SDU function block in the BSC processes the DCCH reverse message received from the BTS at the predetermined period;

FIG. 13 is a flow chart illustrating a procedure for receiving a DCCH forward message according to an embodiment of the present invention, wherein the BTS processes the DCCH forward message received from the SDU function block in the BSC at the predetermined period;

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
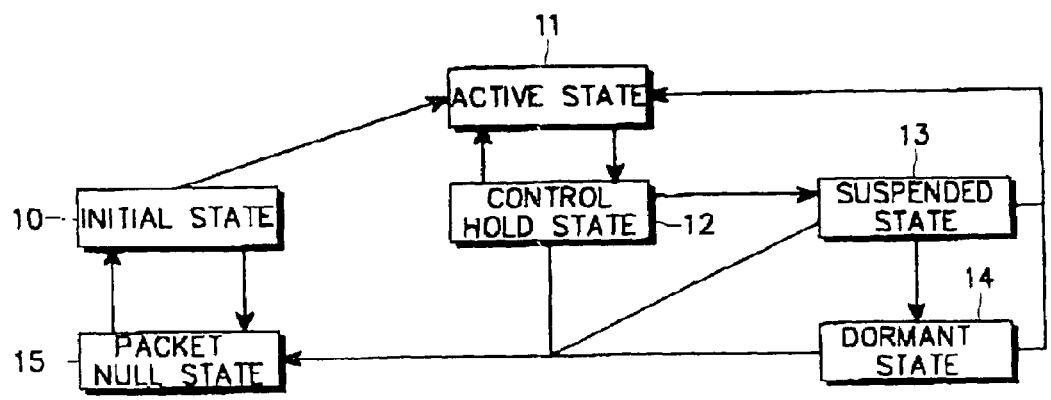
FIG. 1 is a state transition diagram of a mobile communication system for a common packet service.
Figure 2:
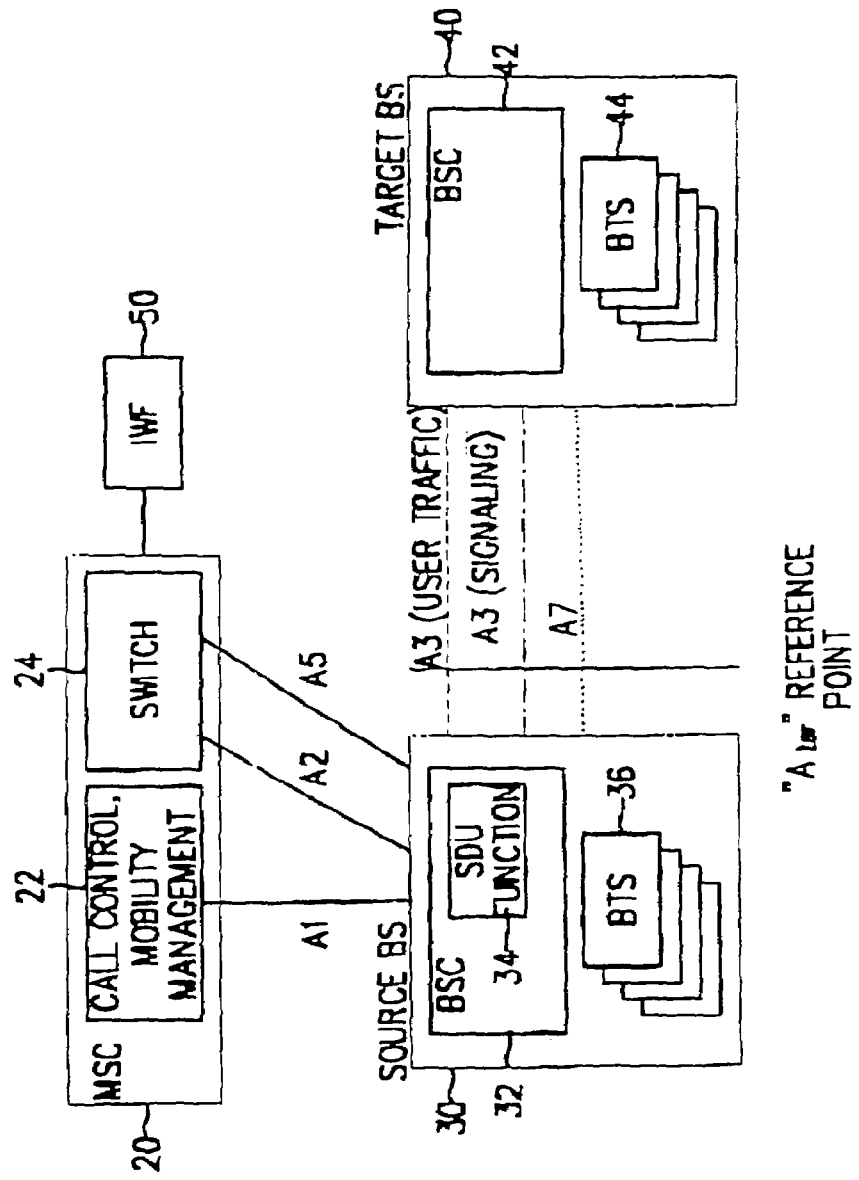
FIG. 2 is a diagram illustrating a reference model of a 3G IOS (Interoperability Specifications) for a digital air interface between a mobile switching center (MSC) and a base station (BS), and between the base stations in a common mobile communication system.
Figure 7:
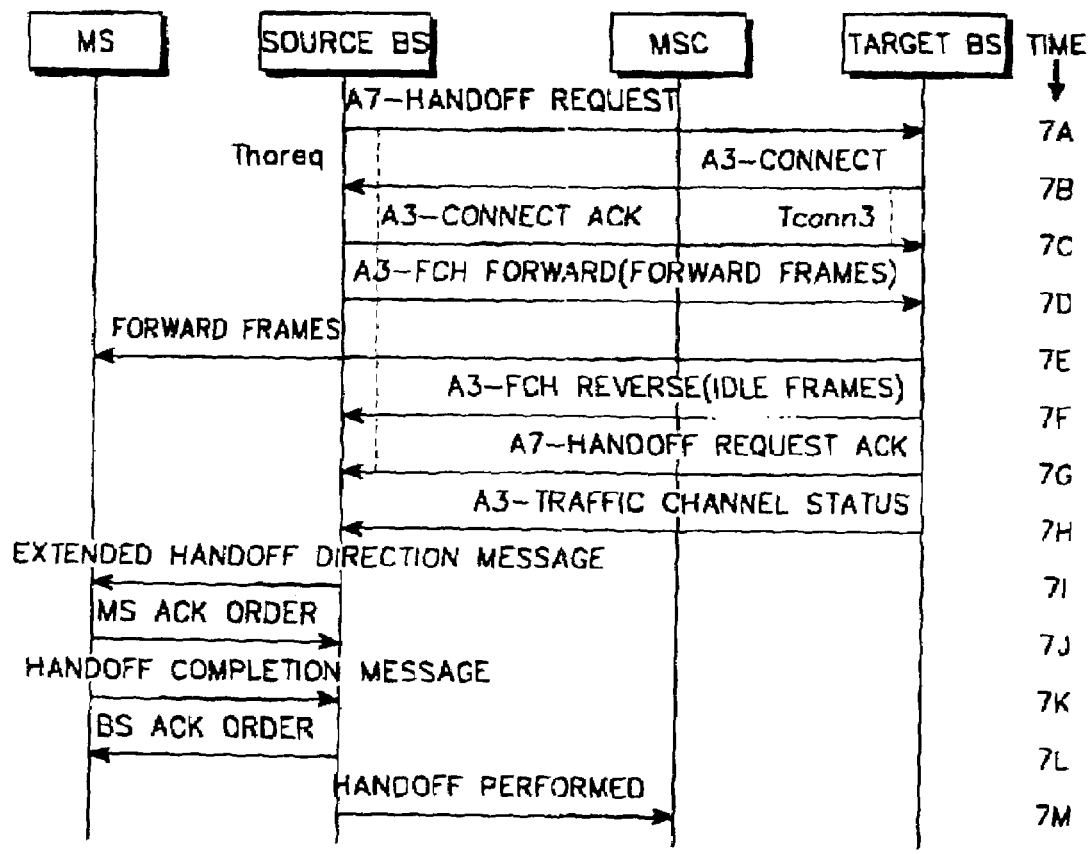
FIG. 7 is a flow diagram illustrating a soft/softer handoff addition procedure according to the prior art.
Figure 8:
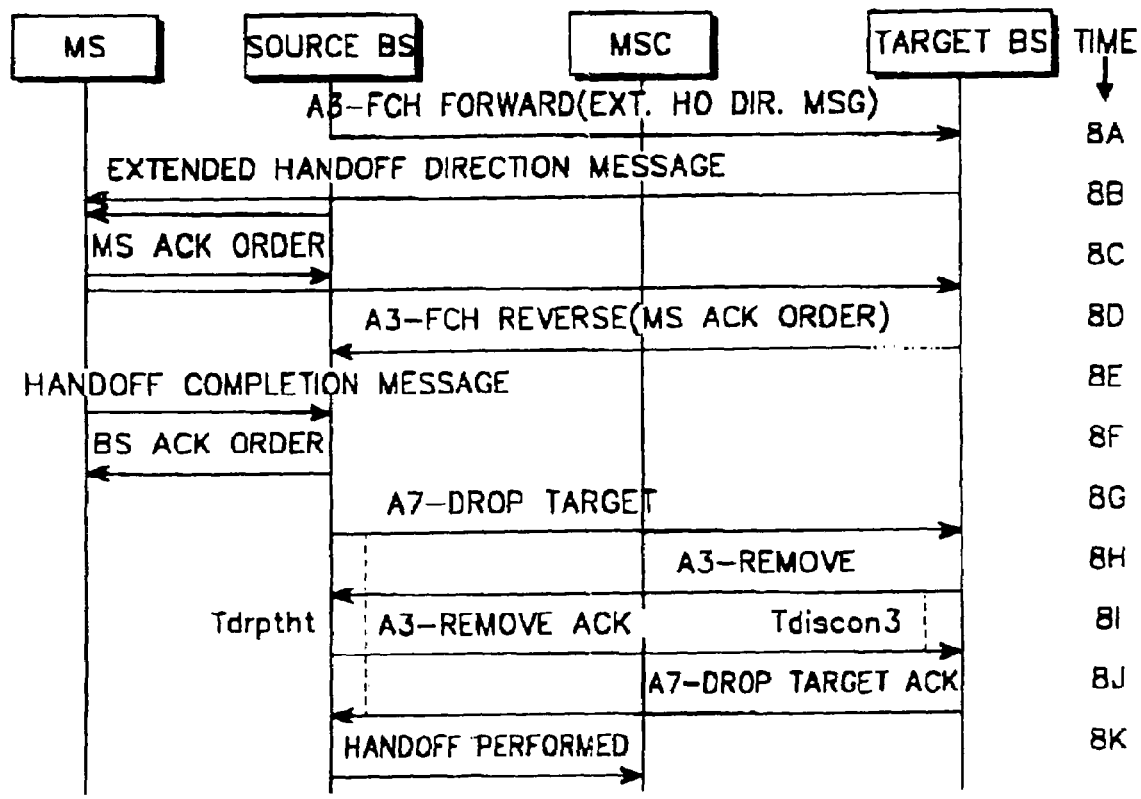
FIG. 8 is a flow diagram illustrating a soft/softer handoff removal procedure according to the prior art.
Figure 9:
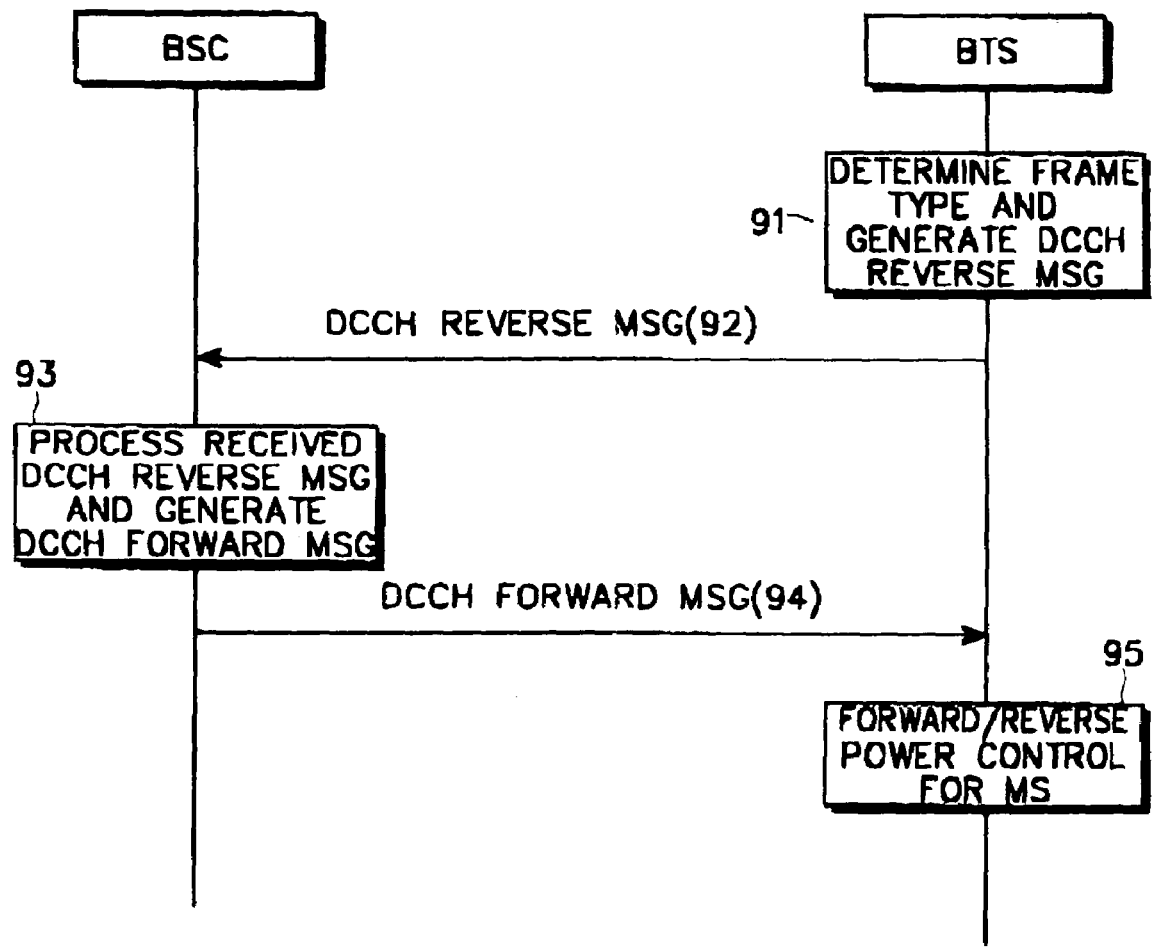
FIG. 9 is a flow diagram illustrating a procedure for transmitting and receiving a DCCH signal between the BTS and the BSC according to an embodiment of the present invention.

FIG. 9 shows a procedure for transmitting and receiving a DCCH signal between the BTS and the BSC (more specifically, the SDU function block in the BSC) according to an embodiment of the present invention. This operation can be performed either between the BSC 32 (BSC-SDU 34) and the BTS 36 in the source BS 30 of FIG. 2, or between the BSC 42 and the BTS 44 in the target base station 40. [Proponent's Comments: It is correct.] This FIG. 9 can be applied to the source BSC-source BTS in a single BS and to the source BSC-target BTS in the adjacent two BSs.

Referring to FIG. 9, upon detection of the DTX mode, the BTS determines the type of the data frame to be transmitted to the BSC and generates a DCCH reverse message, in step 91. The generated DCCH reverse message is a message to be transmitted to the BSC at a predetermined time period (e.g., 20 ms) with regard to a DCCH reverse frame transmitted from the MS (not shown) at the predetermined time period. Generally, there should be the forward and the reverse DCCH signaling message to be sent/received each other between BSC and BTS over the BSC-BTS interface for sending control information even if there is no data to be sent at both sides. Over the air, the forward DCCH and the reverse DCCH should be established for sending the data and the power control information even if the MS or the BTS has some data to be sent to the other side on the reverse or forward direction only. Further description of step 91 will be made below with reference to FIG. 10. The BTS transmits the generated DCCH reverse message to the BSC in step 92, and this DCCH reverse message can include a data/null/idle/erasure frame. The BSC receives and processes the transmitted DCCH reverse message in step 93. Further, the BSC generates a DCCH forward message to be transmitted to the BTS. A receiving operation of the transmitted DCCH reverse message will be described in detail with reference to FIG. 12, and an operation of processing the received DCCH reverse message and generating the DCCH forward message will be described in detail with reference to FIG. 11. The BSC sends the generated DCCH forward message to the BTS in step 94. The transmitted DCCH forward message can include a data/null/idle/erasure frame. The BTS performs forward and reverse power control on the MS based on the power control information included in the received DCCH forward message, in step 95. A receiving operation of such a DCCH forward message will be described in detail with reference to FIG. 13.

In sum, the BTS receives a data frame from the MS at the predetermined period (20 ms), generates a DCCH reverse message at the predetermined period and transmits the generated DCCH reverse message FYI. The BSC processes the received DCCH reverse message, and thereafter generates and transmits a DCCH forward message. The BTS then reads the power control information included in the DCCH forward message from the BSC to perform power control on the MS.

Figure 10A:
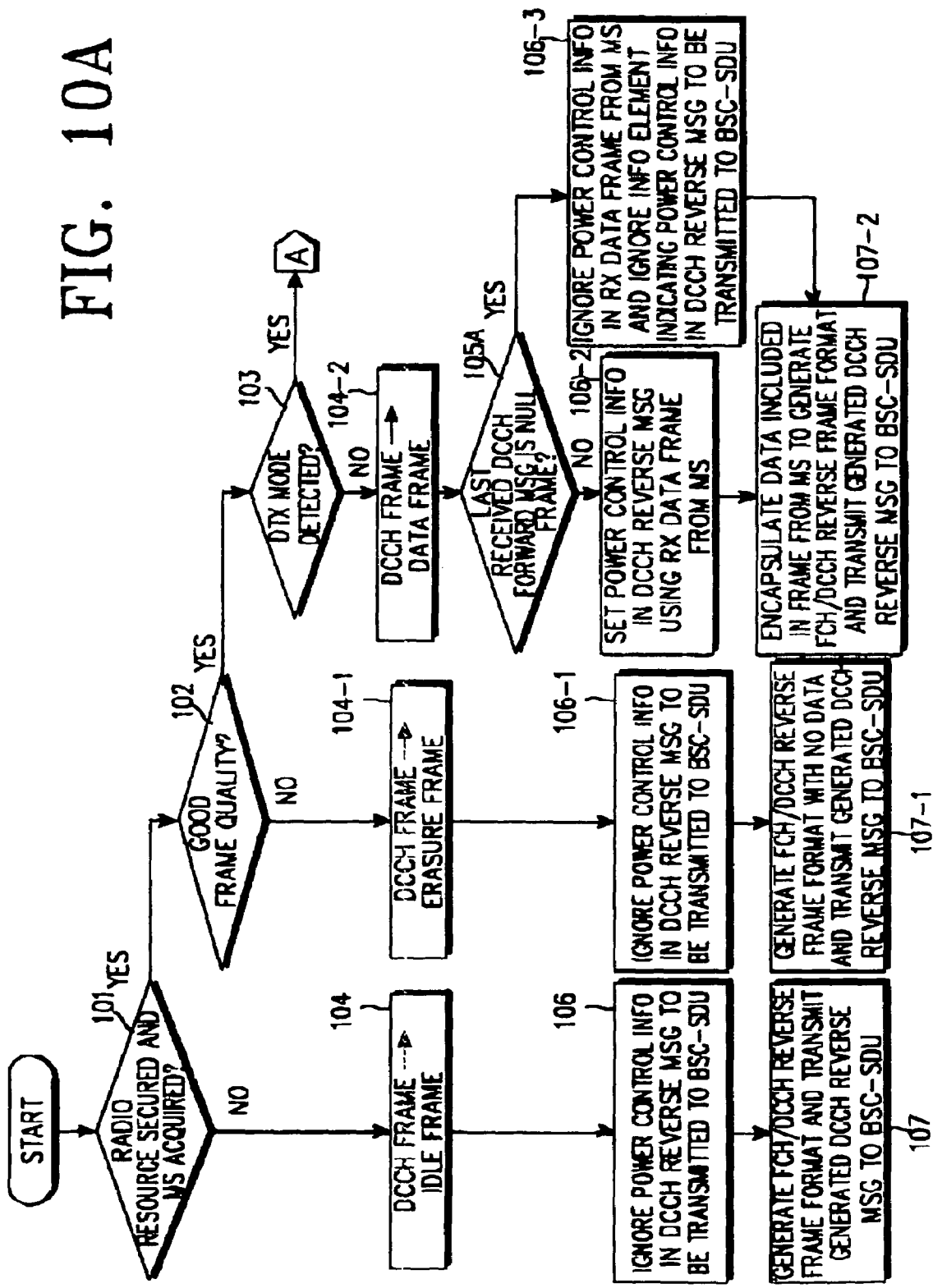
FIGS. 10A and 10B are flow charts illustrating a procedure for transmitting a DCCH reverse message according to an embodiment of the present invention, wherein the BTS transmits a frame received from the MS at a predetermined period to a SDU (frame Selection/Distribution Unit) function block in the BSC as a DCCH reverse message.
Figure 10B:
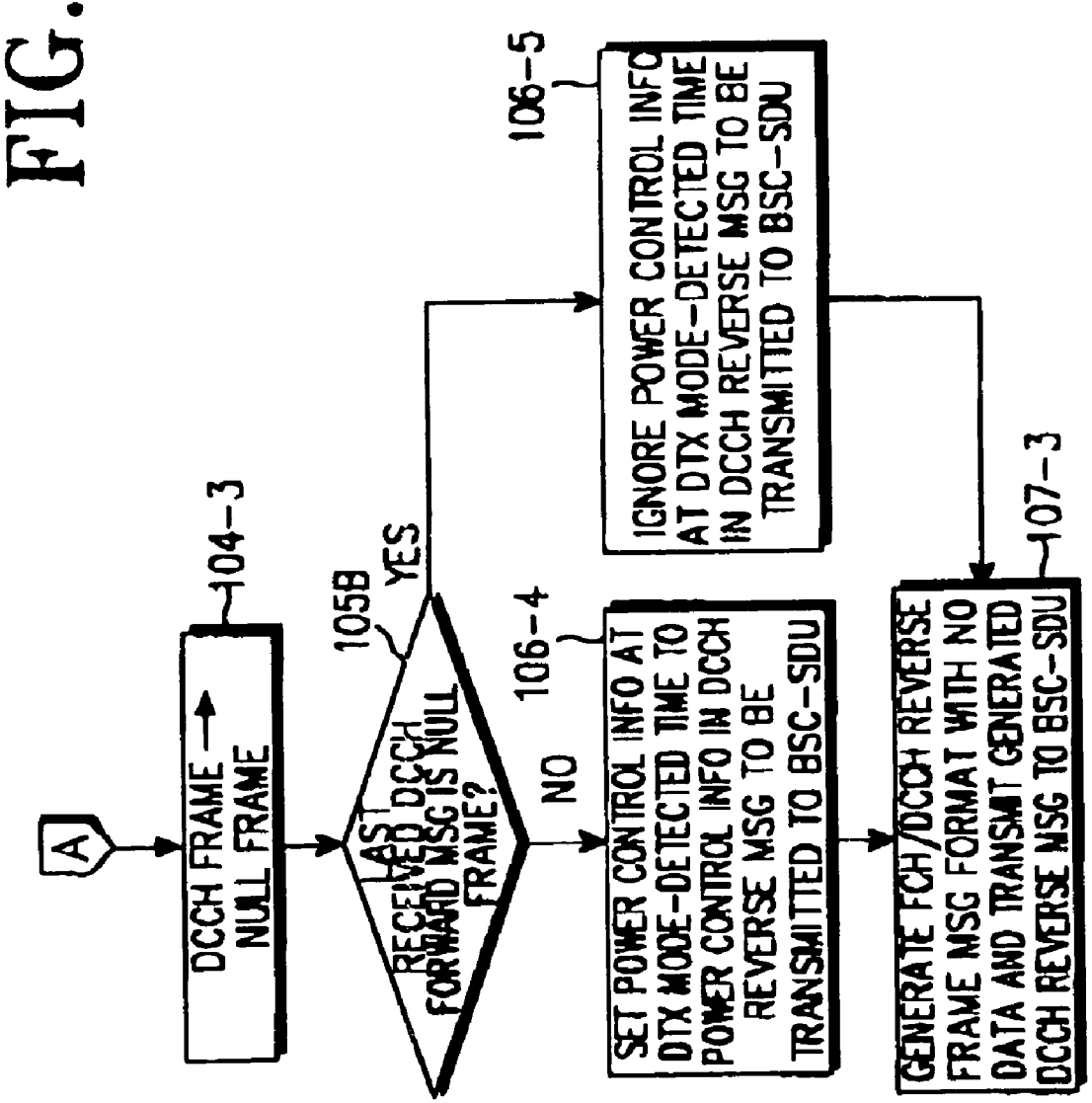

FIGS. 10A and 10B show a procedure for transmitting the DCCH reverse message according to an embodiment of the present invention, wherein the BTS transmits a frame received from the MS at a predetermined period to the SDU function block in the BSC as a DCCH reverse message. Herein, for the forward/reverse DCCH message exchanged between the BSC-SDU function block and the BTS, the FCH message shown in FIGS. 3 to 6 is used, as it is. However, it should be noted that the present invention defines the forward DCCH message as a FCH/DCCH forward message and a reverse DCCH message as a FCH/DCCH reverse message.

Referring to FIG. 10A, the BTS determines in step 101 whether a radio resource to the MS is secured and the MS is acquired. When it is determined in step 101 that the BTS fails to secure the radio resource to the MS and acquire the MS, the BTS decides in step 104 that it is needs to be presently synchronized FYI_the DCCH frame contents out of the message shown in FIG. 6 to an idle frame in order to acquire synchronization even between the BSC-SDU function block and the BTS. Since synchronization between the BSC-SDU function block and the BTS is being acquired, the BTS sets the BSC-SDU function block to ignore the power control-related information in the DCCH reverse message to be transmitted to the BSC-SDU function block, in step 106. In step 107, the IS-2000 FCH/DCCH reverse message having the frame format shown in FIG. 6 is generated and the generated DCCH reverse message is transmitted to the BSC-SDU function.

Otherwise, if it is determined in step 101 that the BTS secures the radio resource to the MS and acquires the MS, the BTS examines a quality of the data frame received from the MS in step 102. If it is determined in step 102 that the received data frame has a low quality, the BTS sets the rate set indicator or [OF?] the DCCH frame contents out of the message shown in FIG. 6 to an erasure frame in step 104-1. After the step 104-1, the BTS sets the BSC-SDU function block to ignore the power control-related information in the DCCH reverse message to be transmitted to the BSC-SDU function block, in step 106-1. In step 107-1, since the frame received from the MS has a low quality, the BTS generates the IS-2000 FCH/DCCH reverse frame message with no data, and transmits the generated FCH/DCCH reverse message to the BSC-SDU function block. The BSC-SDU function block then recognizes the erasure frame and requests power-up of the MS for reverse power control. That is, since the data frame received from the MS has a low quality, the BSC-SDU function block requests the MS to transmit the data frame at increased transmission power.

If it is determined in step 102 that the received data frame has a good quality, the BTS determines in step 103 whether the DTX mode is detected or not while receiving the reverse DCCH frame from the MS. For DTX mode detection, it is possible to use the existing method for detecting the DTX mode in the radio link between the MS and the BTS. When the DTX mode is not detected, the BTS proceeds to step 104-2. Otherwise, when the DTX mode is detected, the BTS proceeds to step 104-3.

In step 104-2, the BTS sets the rate set indicator shown in FIG. 6 to the Rate Set 1 (9600 bps) or the Rate Set 2 (14400 bps). Thereafter, the BTS determines in step 105A whether the DCCH forward message frame last received from the BSC-SDU function block is a null frame or not. If the last received forward message is not a null frame, the BTS sets the power control-related information element using the DCCH frame received from the MS in step 106-2. Otherwise, when the last received forward message is a null frame, the BTS ignores the power control information in the DCCH reverse message to be transmitted to the BSC-SDU function block from the 20 ms data frame received from the MS, and sets the BSC-SDU function block to ignore the information element indicating the power control information, in step 106-3 length of data frame. The air frames of DCCH on the forward/reverse direction are sent every 20 ms with frames including all available data of 20 ms period. After either step 106-2 or step 106-3, the BTS encapsulates the data included in the 20 ms frame received from the MS to generate the IS-2000 FCH/DCCH reverse frame having the format shown in FIG. 6 and transmits the generated IS-2000 DCCH reverse message to the BSC-SDU function block, in step 107-2. The data received from the MS is transmitted to the BSC-SDU function block by being loaded in the channel information field shown in FIG. 6.

When the DTX mode is detected in step 103, the process jumps to FIG. 10B, where the BTS sets the IS-2000 DCCH frame contents shown in FIG. 6 to the null frame in step 104-3. That is, the BTS sets the rate set indicator information element shown in FIG. 6 to the null frame. After the step 104-3, the BTS performs step 105B which is identical to step 105A performed after the step 104-2 on FIG. 10A. In step 105B, the BTS determines whether the DCCH forward message last received from the BSC-SDU function block is a null frame or not. If the DCCH forward message last received from the BSC-SDU function block is not a null frame, the BTS sets the power control information at the time point where the DTX mode is detected, to the power control-related information element, in step 106-4. Otherwise, when the DCCH forward message last received from the BSC-SDU function block is a null frame, the BTS ignores all the power control-related information at the time point where the DTX mode is detected, out of the power control information of the DCCH reverse message, shown in FIG. 6, to be transmitted to the BSC-SDU function block, and sets the BSC-SDU function block to ignore the power control information element, in step 106-5. After either step 106-4 or step 106-5, since there is no data in the 20 ms frame received from the MS, the BTS generates the IS-2000 FCH/DCCH reverse frame format with no data, shown in FIG. 6, and transmits the generated IS-2000 FCH/DCCH reverse message to the BSC-SDU function block. At this point, the channel information shown in FIG. 6 is transmitted to the BSC-SDU function block with no data filled therein.

Figure 11A:
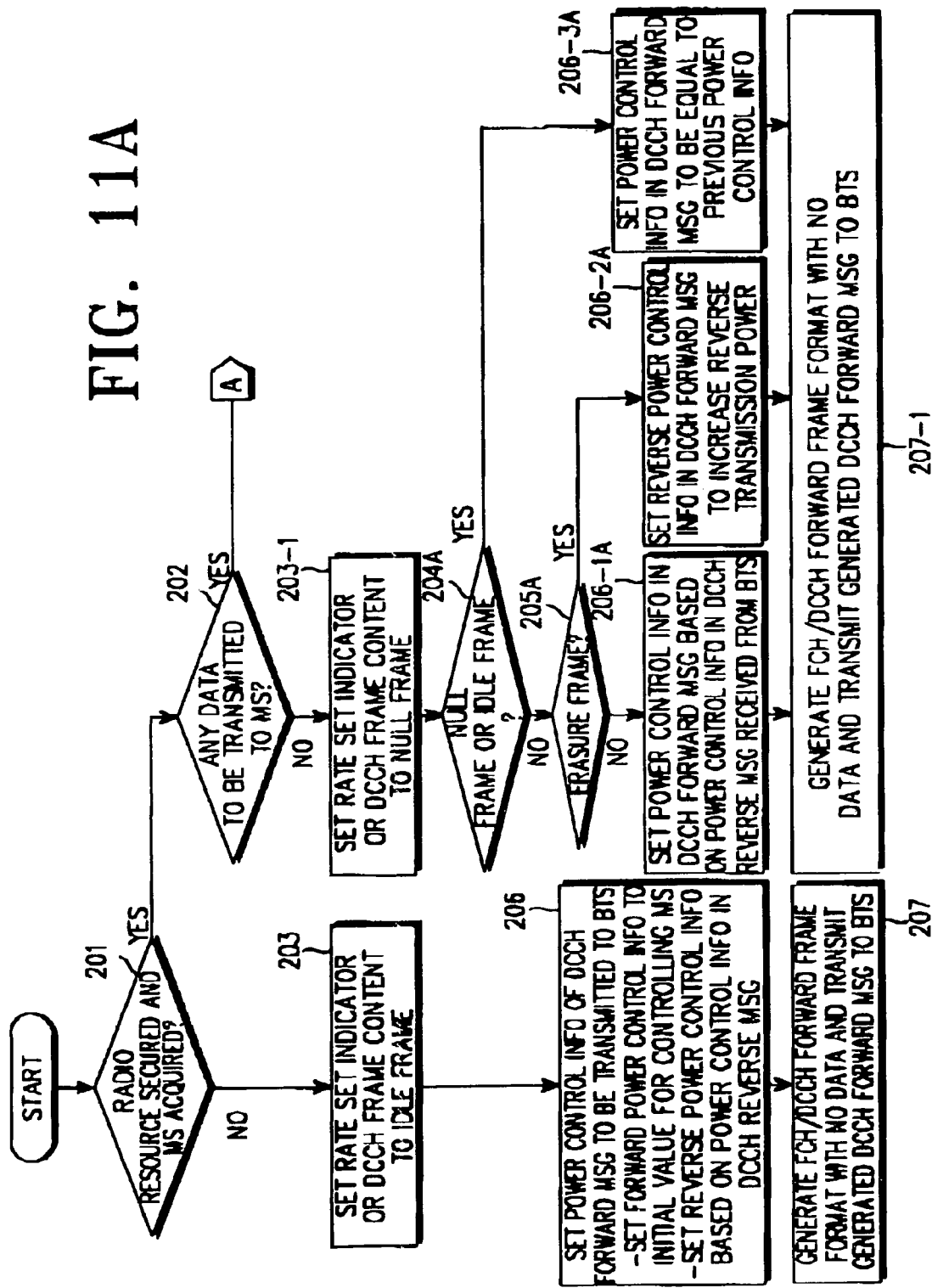
FIGS. 11A and 11B are flow charts illustrating a procedure for transmitting a DCCH forward message according to an embodiment of the present invention, wherein the SDU function block in the BSC transmits the DCCH forward message to the BTS at a predetermined period.
Figure 11B:
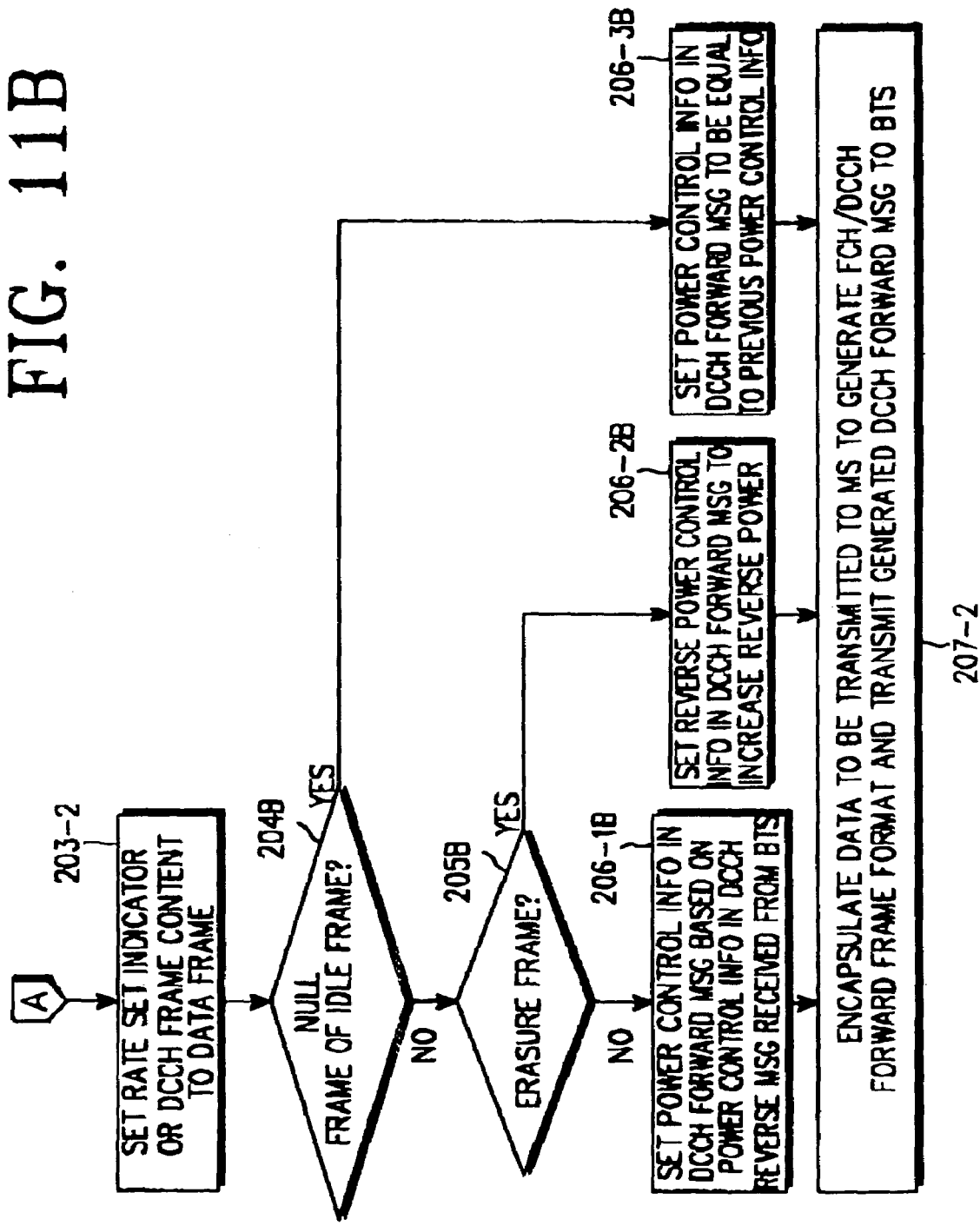

FIGS. 11A and 11B show a procedure for transmitting a DCCH forward message according to an embodiment of the present invention, wherein the BSC-SDU function block transmits the DCCH forward message to the BTS at a predetermined period (20 ms frame period). Herein, for the forward/reverse DCCH message exchanged between the BSC-SDU function block and the BTS, the FCH message shown in FIGS. 3 to 6 is used, as it is. However, it should be noted that the present invention defines the forward DCCH message as a FCH/DCCH forward message and the reverse DCCH message as a FCH/DCCH reverse message.

Referring to FIG. 11A, the BSC-SDU function block determines in step 201 whether a forward radio resource to the MS is secured and the MS is acquired. If the forward radio resource to the MS is not secured and the MS is not acquired, the BSC-SDU function block decides that synchronization to the MS is presently being acquired in the forward direction, and sets the rate set indicator or the DCCH frame contents out of the message shown in FIG. 4 to an idle frame in order to acquire synchronization between the BSC-SDU function block and the BTS, in step 203. At this point, since synchronization is being acquired, the BSC-SDU function block properly sets power control-related information in the DCCH forward message to be transmitted to the BTS in step 206. The BSC-SDU function block sets the forward power control information to an initial value for controlling the MS, and sets the reverse power control information depending on power control information from the received results of the DCCH reverse message provided from the BTS every 20. ms. After step 206, the BSC-SDU function block transmits the power control information-set DCCH forward message to the BTS in step 207. The transmitted DCCH forward message has no data loaded.

If it is determined in step 201 that the radio resource to the MS is secured and the MS is acquired, the BSC-SDU function block determines in step 202 whether there is data to be transmitted from the BSC or the external network element (e.g., PDSN(packet data service network)) to the MS. When it is determined that there is no data to be transmitted to the MS, the BSC-SDU function block proceeds to step 203-1. Otherwise, when it is determined that there is data to be transmitted to the MS, the BSC-SDU function block proceeds to step 203-2.

In step 203-1, the BSC-SDU function block sets the rate set indicator or the DCCH frame contents out of the information element in the DCCH forward message shown in FIG. 4 to a null frame. Thereafter, the BSC-SDU function block determines in step 204A whether the frame content of the DCCH reverse message last received from the BTS is either a null frame or an idle frame. If it is determined in step 204A that the DCCH reverse message frame last received from the BTS is neither the null frame nor the idle frame, the BSC-SDU function block determines in step 205A whether the frame content of the DCCH reverse message last received from the BTS is an erasure frame. If the last received message frame is not the erasure frame, the BSC-SDU function block designates power control information of the DCCH forward message shown in FIG. 4 depending on the power control information from the received results of the DCCH reverse message shown in FIG. 6 provided from the BTS every 20. ms, in step 206-1A. At this point, since there is no data to be transmitted to the MS, the BSC-SDU function block generates the FCH/DCCH forward frame format with no data and transmits the generated DCCH forward message to the BTS in step 207-1.

If it is determined in step 205A that the frame content of the DCCH reverse message last received from the BTS is the erasure frame, it means that the DCCH reverse message provided from the BTS every 20 ms corresponds to the erasure frame. Therefore, in step 206-2A, the BSC-SDU function block designates the reverse power control message value of the DCCH forward message so as to increase reverse power. At this point, since there is no data to be transmitted to the MS, the BSC-SDU function block performs step 207-1 after step 206-2A. That is, after step 206-2A, the BSC-SDU function block generates the FCH/DCCH forward frame format with no data and transmits the generated DCCH forward message to the BTS.

If it is determined in step 204A that the frame content of the DCCH reverse message last received from the BTS is either the null frame or the idle frame, the BSC-SDU function block maintains the existing power control information included in the received results of the DCCH reverse message shown in FIG. 6 provided from the BTS every 20 ms, in step 206-3A. The existing power control information maintaining operation is continuously performed until the frame provided from the BTS is not the null frame or the idle frame but the data frame or the erasure frame. That is, the BSC-SDU function block designates the power control information value of the DCCH forward message to be equal to the previous value in step 206-3A. At this point, since there is no data to be transmitted to the MS, the BSC-SDU function block generates the FCH/DCCH forward frame format with no data and transmits the generated DCCH forward message to the BTS, in step 207-1.

If it is determined in step 202 that there is data to be transmitted to the MS, the process jumps to FIG. 11B where the BSC-SDU function block sets the rate set indicator or the DCCH frame content out of the information element in the DCCH forward message shown in FIG. 4 to a data frame of 9600 bps or 14400 bps, in step 203-2 of FIG. 11B. After step 203-2, the same operation as that performed after step 203-1 will be performed. That is, after step 203-2, steps 204B, 205B, 206-1B, 206-2B, 206-3B and 207-2 may be performed, wherein steps 204B, 205B, 206-1B, 206-2B and 206-3B have the same operation as steps 204A, 205A, 206-1A, 206-2A and 206-3A. The BSC-SDU function block determines in step 204B whether the frame content of the DCCH reverse message last received from the BTS is a null frame or an idle frame.

If it is determined in step 204B that the DCCH reverse message frame last received from the BTS is neither the null frame nor the idle frame, the BSC-SDU function block determines in step 205B whether the frame content of the DCCH reverse message last received from the BTS is an erasure frame. If the last received message frame is not the erasure frame, the BSC-SDU function block designates power control information of the DCCH forward message shown in FIG. 4 depending on the power control information from the receiving results of the DCCH reverse message shown in FIG. 6 provided from the BTS every 20 ms, in step 206-1B. At this point, since there exists data to be transmitted to the MS, the BSC-SDU function block encapsulates the transmission data to generate the FCH/DCCH forward frame format and transmits the generated DCCH forward message to the BTS, in step 207-2.

If it is determined in step 205B that the frame content of the DCCH reverse message last received from the BTS is the erasure frame, it means that the DCCH reverse message provided from the BTS every 20 ms corresponds to the erasure frame. Therefore, in step 206-2B, the BSC-SDU function block designates the reverse power control message value of the DCCH forward message so as to increase reverse power. At this point, since there exists data to be transmitted to the MS, the BSC-SDU function block performs step 207-2 after step 206-2B. That is, after step 206-2B, the BSC-SDU function block generates the FCH/DCCH forward frame format with transmission data and transmits the generated DCCH forward message to the BTS, in step 207-2.

If it is determined in step 204B that the frame content of the DCCH reverse message last received from the BTS is either the null frame or the idle frame, the BSC-SDU function block maintains the existing power control information included in the received results of the DCCH reverse message shown in FIG. 6 provided from the BTS every 20 ms, in step 206-3B. The existing power control information maintaining operation is continuously performed until the frame provided from the BTS is neither the null frame nor the idle frame but the data frame or the erasure frame. That is, the BSC-SDU function block designates the power control information value of the DCCH forward message to be equal to the previous value in step 206-3B. At this point, since there exists data to be transmitted to the MS, the BSC-SDU function block generates the FCH/DCCH forward frame format with transmission data and transmits the generated DCCH forward message to the BTS, in step 207-2.

FIG. 12 shows a procedure for receiving a DCCH reverse message according to the present invention, wherein the BSC-SDU function block receives the DCCH reverse message provided from the BTS at predetermined period (e.g., 20 ms frame)

Referring to FIG. 12, the BSC-SDU function block receives the DCCH reverse message from the BTS every 20 ms in step 300. The BSC-SDU function block determines in step 301 whether the rate set indicator or the frame content of the message received in step 300 indicates the erasure frame. If it is determined in step 301 that the rate set indicator or the frame content indicates an erasure frame, the BSC-SDU function block performs step 304. Otherwise, when the rate set indicator or the frame content does not indicate an erasure frame, the BSC-SDU function block performs step 302. Since the fact that the erasure frame is received means that the frame that the BTS received from the MS has a low quality, the BSC-SDU function block ignores the whole information of the DCCH reverse message received from the BTS and determines to increase reverse power, in step 304. That is, in step 304, the BSC-SDU function block generates the DCCH forward message for increasing the reverse power and transmits the generated DCCH forward message to the BTS.

If it is determined in step 301 that the rate set indicator or the frame content does not indicate an erasure frame, the BSC-SDU function block determines in step 302 whether the rate set indicator or the frame content of the received message indicates an idle frame. If the rate set indicator or the frame content indicates an idle frame in step 302, the BSC-SDU function block ignores the whole information of the DCCH reverse message received from the BTS and generates a DCCH forward message to be transmitted to the BTS, including the information for designating an initially defined value to be used for the reverse power control information for the MS, judging that the BTS has not yet recognized or assigned the radio resource from the MS, in step 304-1. That is, in step 304-1, the BSC-SDU function block ignores the whole information of the DCCH reverse message and determines to use the initially defined value for the reverse power control information for the MS.

If it is determined in step 302 that the rate set indicator or the frame content does not indicate an idle frame, the BSC-SDU function block determines in step 303 whether the rate set indicator or the frame content of the received message indicates the null frame. If the rate set indicator or the frame content indicates a null frame in step 303, the BSC-SDU function block ignores the power control-related information in the DCCH reverse message received from the BTS, and generates a DCCH forward message to be transmitted to the BTS, including the information for designating a value defined immediately before the DTX mode to be used for the reverse power control information for the MS, judging that a reverse channel between the MS and the BTS is presently in the DTX period, in step 304-2. That is, in step 304-2, the BSC-SDU function block ignores the power control-related information of the DCCH reverse message and determines to use the value determined immediately before the DTX mode for the reverse power control information for the MS.

If it is determined in step 303 that the rate set indicator or the frame content does not indicate a null frame, it means that the received message is a data frame. Therefore, the BSC-SDU function block transmits the data included in the channel information of the DCCH reverse message received from the BTS to a corresponding data processing device (not shown) according to the type of the data, and analyzes the power control-related information to generate a DCCH forward message to be transmitted to the BTS, including the forward/reverse power control information for the MS, in step 304-3. That is, in step 304-3, the BSC-SDU function block analyzes the data and power control information included in the channel information of the DCCH reverse message to determine the power control information for the MS.

FIG. 13 shows a procedure for receiving a DCCH forward message according to an embodiment of the present invention, wherein the BTS receives the DCCH forward message provided from the BSC-SDU function block at a predetermined period (e.g., 20 ms frame) Referring to FIG. 13, the BTS receives the DCCH forward message from the BSC-SDU function block every 20 ms in step 400. The BTS determines in step 401 whether the rate set indicator or the frame content of the received DCCH forward message indicates the idle frame. If it is determined in step 401 that an idle frame is received, the BTS analyzes the whole information of the DCCH forward message received from the BSC-SDU function block and provides a power control processor (not shown) with the forward/reverse power control information for the MS using the value defined in the forward message. At this point, no frame is transmitted in the forward direction of the radio link.

If it is determined in step 401 that an idle frame is not received, the BTS determines in step 402 whether the rate set indicator or the frame content of the received DCCH forward message indicates a null frame. When it is determined in step 402 that a null frame is received, the BTS analyzes the whole information of the DCCH forward message received from the BSC-SDU function block and provides the power control processor with the forward/reverse power control information for the MS using the value defined in the forward message. That is, in step 403-1, the BTS determines the value defined in the DCCH forward message as the forward/reverse power control information for the MS. At this point, the forward power control value is maintained to a value before the null frame is first received, and the DCCH null frame is transmitted in the forward direction of the radio link.

If it is determined in step 402 that a null frame is not received, it means that the data frame is received. Therefore, the BTS analyzes the whole information of the DCCH forward message received from the BSC-SDU function block and provides the power control processor with the forward/reverse power control information for the MS using the value defined in the forward message. That is, in step 403-2, the BTS determines the value defined in the DCCH forward message as the forward/reverse power control information for the MS. At this point, the data included in the channel information of the DCCH forward message is transmitted through the DCCH data frame of the radio link.

Figure 14:
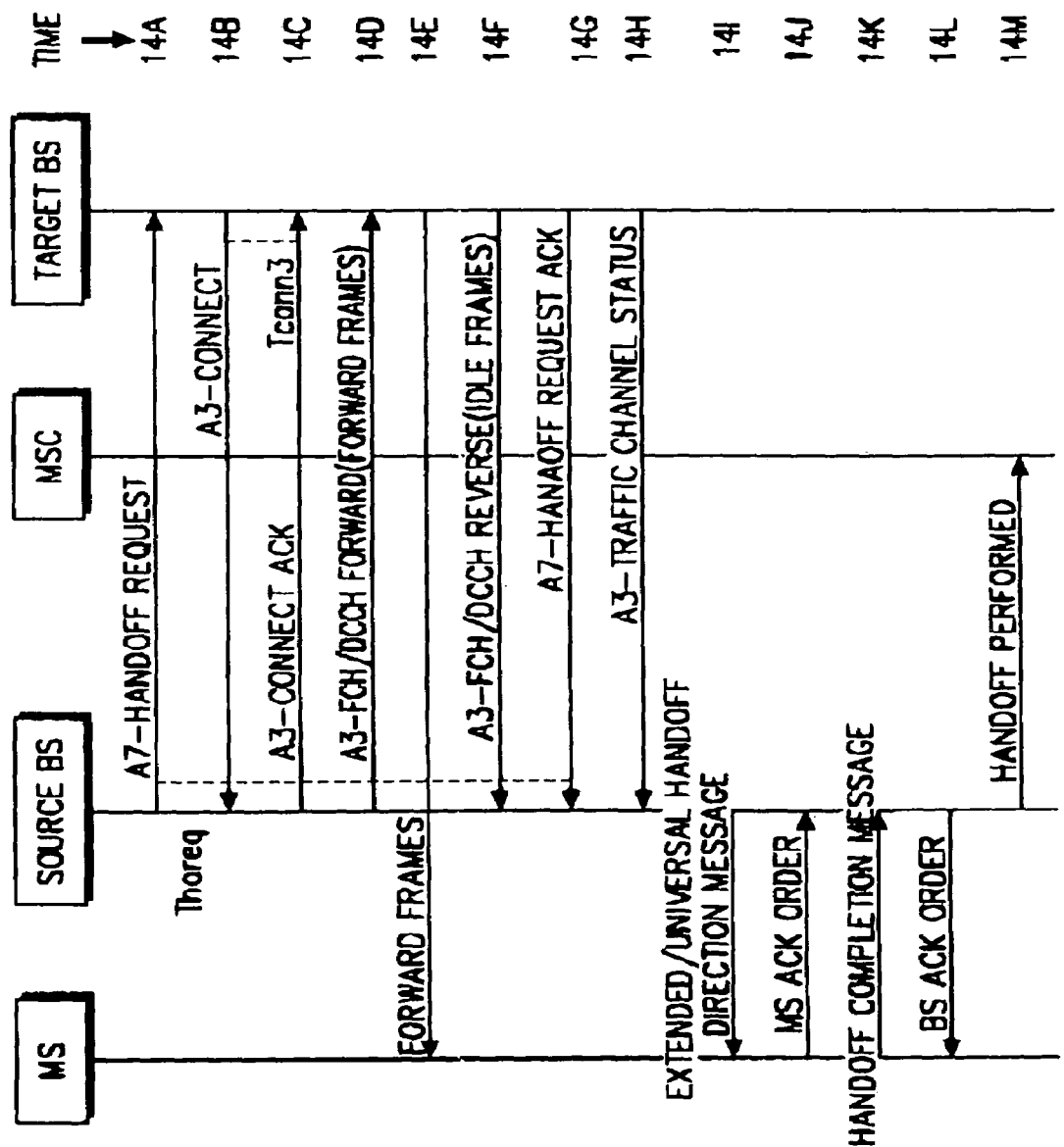
FIG. 14 is a flow diagram illustrating a soft/softer handoff addition procedure according to an embodiment of the present invention.

FIG. 14 shows a soft/softer handoff addition procedure according to an embodiment of the present invention. In this procedure, an A3-FCH forward message and an A3-FCH reverse message are extended to an A3-FCH/DCCH forward message and an A3-FCH/DCCH reverse message so as to support a UHDM (Universal Handoff Direction Message), to transmit the forward/reverse DCCH frame between the source BS and the target BS, and to support the DTX mode.

Referring to FIG. 14, the source BS sends in step 14a an A7-handoff request message to the target BS and activates a timer Thoreq, judging that one or more cells of the target BS are required to support the present call during soft handoff. The target BS sends an A3-connect message to a designated address to initiate A3-connection in response to the A7-handoff request message, in step 14b. The source BS sends an A3-connect Ack message to acknowledge completion of A3-connection or cell addition to the existing A3-connection, in step 14c.

The source BS sends an A3-FCH/DCCH forward message (forward frames) according to an embodiment of the invention to the target BS in step 14d. Upon acquiring synchronization, the target BS starts to send forward frames to the MS in step 14e. Upon receipt of the first forward frame from the source BS, the target BS starts to transmit the A3-FCH/DCCH reverse message with a reverse idle frame according to an embodiment of the present invention, in step 14f. This reverse message frame includes time control information required for acquiring synchronization. The target BS sends an A7-handoff request Ack message indicating successful cell addition to the source BS in step 14g. The source BS inactivates the timer Thoreq in response to the A7-handoff request Ack message. If the SDU function block of the source BS and the target BS are selected such that transmission start and acceptance to the target BS should be known to the source BS when the A3-traffic subchannel is synchronized, the target BS sends an A3-traffic channel status message in step 14h. This process is performed after step 14d.

The source BS sends an extended/universal handoff direction message to the MS to add the new cells to the active set according to an embodiment of the present invention, in step 14i. The MS sends an MS Ack order message to the source BS to acknowledge receipt of the extended/universal handoff direction message in step 14j. The MS sends a handoff completion message to the source BS to indicate the successful process of the extended/universal handoff direction message in step 14k. The source BS sends a BS Ack order message to the MS to acknowledge receipt of the handoff completion message in step 14l. The source BS sends a handoff performed message to the MSC in step 14m. The base station can transmit the handoff performed message any time after receiving the handoff completion message.

Figure 15:
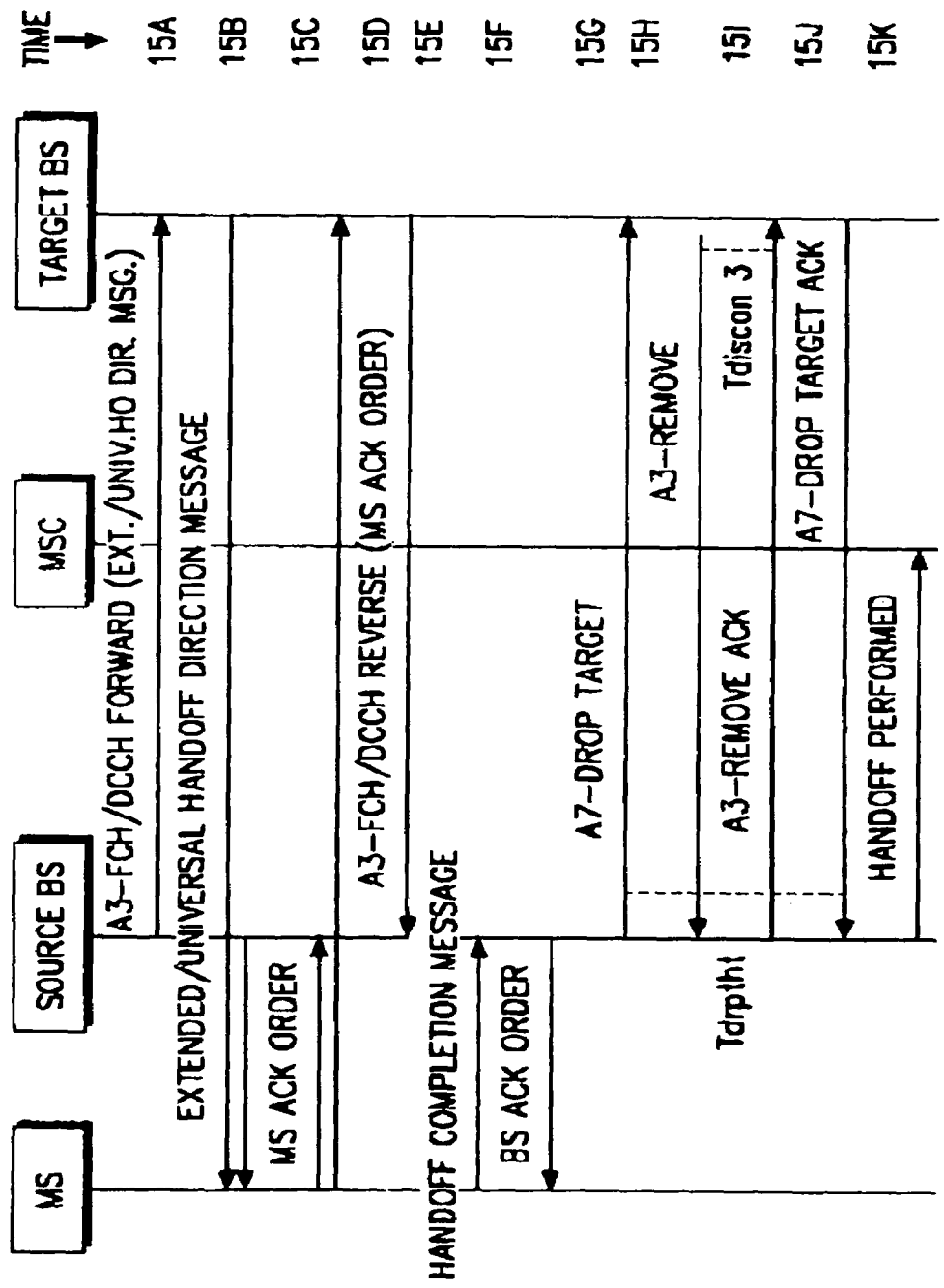
FIG. 15 is a flow diagram illustrating a soft/softer handoff removal procedure according to an embodiment of the present invention.

FIG. 15 shows a soft/softer handoff removal procedure according to an embodiment of the present invention. In this procedure, existing A3-FCH forward message and A3-FCH reverse message are extended to an A3-FCH/DCCH forward message and an A3-FCH/DCCH reverse message so as to support a UHDM (Universal Handoff Direction Message), to transmit the forward/reverse DCCH frame between the source BS and the target BS, and to support the DTX mode.

Referring to FIG. 15, the source BS encapsulates the extended/universal handoff direction message in the A3-FCH/DCCH forward message according to an embodiment of the present invention and transmits it to the target BS in order to drop one or several cells from the active set, in step 15a. The source BS and the target BS send the extended/universal handoff direction message to the MS in step 15b.

The MS sends an MS Ack order message to the source BS and the target BS to acknowledge receipt of the extended/universal handoff direction message in step 15c. The target BS loads the MS Ack order message received from the MS in the A3-FCH/DCCH reverse message and sends it to the source BS in step 15d. The MS sends a handoff completion message to the source BS to indicate the successful process of the extended/universal handoff direction message in step 15e. The source BS sends a BS Ack order message to the MS to acknowledge receipt of the handoff completion message in step 15f. As described above, an embodiment of the present invention defines the existing A3-FCH forward message and A3-FCH reverse message as the A3-FCH/DCCH forward message and A3-FCH/DCCH reverse message in order to transmit the forward/reverse DCCH frame between the source BS and the target BS and to support the DTX mode. The A3-FCH/DCCH forward message and the A3-FCH/DCCH reverse message, newly defined according to an embodiment of the present invention, include information elements having the fields shown in Tables 13 to 17 below. Table 13 shows the information element of the forward layer-3 data included in the A3-FCH/DCCH forward message according to an embodiment of the present invention. Tables 14 to 17 show the information element of the reverse layer-3 data included in the A3-FCH/DCCH reverse message according to the present invention.

TABLE 13

Forward Traffic Channel Rate:

| Field Value | Rate Set 1<br>Transmission Rate | Rate Set 2<br>Transmission Rate |
|---|---|---|
| 0000 | 9600 bps (Full Rate) | 14400 bps (Full Rate) |
| 0001 | 4800 bps (Half Rate) | 7200 bps (Half Rate) |
| 0010 | 2400 bps (Quarter Rate) | 3600 bps (Quarter Rate) |
| 0011 | 1200 bps (Eighth Rate) | 1800 bps (Eighth Rate) |
| 0100 | Idle Frame | Idle Frame |
| 0101 | Null Frame | Null Frame |

All other values are reserved.

Referring to Table 13, the forward traffic channel rate information of the information elements of the forward layer-3 data further indicates the underlined null frame field, as compared with Table 1. If this field is set to indicate the null frame, i.e., if the field value is '0101', the BTS does not transmit the radio frame and ignores all other information elements excepting the power control-related field.

TABLE 14

Reverse Traffic Channel Quality:

| Rate Set 1 Transmission Rate | Rate Set 2 Transmission Rate | Value (α) |
|---|---|---|
| 9600 bps (Full Rate) | 14400 bps (Full Rate) | 1 |
| 4800 bps (Half Rate) | 7200 bps (Half Rate) | 2 |
| 2400 bps (Quarter Rate) | 3600 bps (Quarter Rate) | 4 |
| 1200 bps (Eighth Rate) | 1800 bps (Eighth Rate) | 8 |
| Idle Frame | Idle Frame | 0 |
| Null Frame | Null Frame | 0 |

Referring to Table 14, the reverse traffic channel rate information of the information elements of the reverse layer-3 data further indicates the underlined null frame field, as compared with Table 7. If the forward frame that the BTS has last received from the SDU function block is the null frame, the BTS sets the reverse traffic channel quality field to '00H' to enable the BSC-SDU function block to ignore the corresponding value.

TABLE 15

Reverse Traffic Channel Rate:

| Field Value | Rate Set 1 Transmission Rate | Rate Set 2 Transmission Rate |
|---|---|---|
| 0000 | 9600 bps (Full Rate) | 14400 bps (Full Rate) |
| 0001 | 4800 bps (Half Rate) | 7200 bps (Half Rate) |
| 0010 | 2400 bps (Quarter Rate) | 3600 bps (Quarter Rate) |
| 0011 | 1200 bps (Eighth Rate) | 1800 bps (Eighth Rate) |
| 0100 | Erasure | Erasure |
| 0101 | Idle | Idle |
| 0110 | Rate Set 1 Full Rate Likely | Reserved |
| 0111 | Null | Null |
| All other values are reserved | | |

Referring to Table 15, the reverse traffic channel rate information of the information elements of the reverse layer-3 data further indicates the underlined null frame field, as compared with Table 10. When the BTS acquires the mobile station while receiving no frame from the mobile station, the field value is set to '0111' to designate the null field.

TABLE 16

Reverse Traffic Channel Information:

| Class | Transmission Rate (bps) | Number of Information Bits per Frame |
|---|---|---|
| Rate Set 1 | 9600 | 172 |
| | 4800 | 80 |
| | 2400 | 40 |
| | 1200 | 16 |
| | 0 | 0 |
| Rate Set 2 | 14400 | 267 |
| | 7200 | 125 |
| | 3600 | 55 |
| | 1800 | 21 |
| | 0 | 0 |
| Other | Erasure | 0 |
| | Idle | 0 |
| | Null | 0 |

Referring to Table 16, the reverse traffic channel rate information of the information elements of the reverse layer-3 data further indicates the underlined null frame field, as compared with Table 11. Since the BTS has no frame received from the MS while transmitting the null frame, there is no information to be filled in every frame so that it is possible to designate the null field.

TABLE 17

Layer-3 Fill

| Class | Transmission Rate (bps) | Number of Layer 3 Fill Bits per Frame |
|---|---|---|
| Rate Set 1 | 9600 | 4 |
| | 4800 | 0 |
| | 2400 | 0 |
| | 1200 | 0 |
| | 0 | 0 |
| Rate Set 2 | 14400 | 5 |
| | 7200 | 3 |
| | 3600 | 1 |
| | 1800 | 3 |
| | 0 | 0 |
| Other | Erasure | 0 |
| | Idle | 0 |
| | Null | 0 |

Referring to Table 17, the Layer-3 Fill information of the information elements of the reverse layer-3 data further indicates the underlined null frame field, as compared with Table 12. Since the BTS has no frame received from the MS while transmitting the null frame, there is no Layer-3 Fill information to be filled in every frame so that it is possible to designate the null field.

According to the definitions shown in Tables 13 to 17, in the forward direction, where there is no data to be transmitted from the BSC-SDU function block to the BTS, power control is performed using the power control field only. In the reverse direction, power control can be performed in the same manner as in the pre-null frame state in the MS acquisition state (i.e., a state where the dedicated code channel is assigned and synchronization acquired). Therefore, it is possible to support the DTX mode of the physical channel.

As described above, an embodiment of the present invention can transmit and receive signals between a base station transceiver system (BTS) and a base station controller (BSC) over the dedicated control channel (DCCH) even in discontinuous transmission (DTX) mode, by considering the DTX mode and the DCCH which were not conventionally considered in the base station of the mobile communication system.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for determining, in a base station controller (BSC), information for controlling transmission power of a mobile station, said information depending on a signal received from a base station transceiver system (BTS), in a mobile communication system, said mobile communication system including said mobile station for transmitting and receiving data in a predetermined period, said base station transceiver system and said base station controller for controlling said base station transceiver system, the method comprising the steps of:

receiving, in the base station controller, a reverse message from the base station transceiver system;

determining a type of a frame included in the received reverse message; and setting previous power control information to present power control information if the frame type of the reverse message is a null frame indicating there is no data to transmit;

wherein power control information is for controlling transmission power of the mobile station, and said previous power control information was used prior to receipt of said null frame.

2. The method as claimed in claim 1, further comprising the step of:

setting present power control information to increase transmission power of the mobile station, if the frame type of the reverse message is an erasure frame.

3. The method as claimed in claim 1, further comprising the step of:

setting power control information initially defined during resource assignment to present power control information, if the frame type of the reverse message is an idle frame.

4. A method for determining, in a base station transceiver system (BTS), information for controlling mobile station transmission power depending on a signal received from a base station controller (BSC), in a mobile communication system, said mobile communication system including said mobile station for transmitting and receiving data in a predetermined period, said base station transceiver system and said base station controller for controlling said base station transceiver system, the method comprising the steps of:

receiving, in the base station transceiver system, a forward message from the base station controller;

analyzing a type of a frame included in the received forward message; and setting previous power control information used for power control of the mobile station prior to receipt of a null frame as present power control information for controlling transmission power of the mobile station, if the frame type of the forward message is a null frame indicating that there is no data to transmit.

5. The method as claimed in claim 4, further comprising the step of:

setting power control information included in the forward message as the present power control information, if the frame type of the forward message is an idle frame.

6. The method as claimed in claim 4, further comprising the step of:

setting present power control information to increase transmission power of the mobile station, if the type of frame of the forward message is an erasure frame.

7. A method for transmitting a signal from a base station transceiver system (BTS) to a base station controller (BSC) when there is no data transmitted from a mobile station while in discontinuous transmission (DTX) mode, in a mobile communication system, the method comprising the steps of:

detecting the discontinuous transmission (DTX) mode if there is no reverse traffic;

setting a reverse traffic channel quality field to zero; and transmitting the information of the reverse link quality field to the base station controller.

8. A method for transmitting a signal from a base station transceiver system (BTS) to a base station controller (BSC) when there is no data transmitted from a mobile station while in discontinuous transmission (DTX) mode in a mobile communication system, the method comprising the steps of:

detecting the discontinuous transmission (DTX) mode if there is no reverse traffic;

setting a previous power control information at the time point where the DTX mode is detected, to a present power control information at the time point where the DTX mode is detected, to a present power control information if a DCCH forward message last received form the base station controller is not a null frame; and transmitting the present power control information to base station controller.

9. A method for determining, in a base station controller (BSC), information for controlling transmission power of a mobile station, said information depending on a signal received from a base station transceiver system (BTS), in a mobile communication system, the method comprising the steps of:

receiving, in the base station controller, a reverse message including a reverse traffic channel quality field from the base station transceiver system;

determining whether the information of the reverse traffic channel quality field in the reverse message is zero; and setting previous power control information to present power control information if the information of the reverse traffic channel quality field is zero.

* * * * *